United States Patent
Chiba

(10) Patent No.: US 9,823,911 B2
(45) Date of Patent: Nov. 21, 2017

(54) METHOD AND APPARATUS FOR COMPILING CODE BASED ON A DEPENDENCY TREE

(71) Applicant: FUJITSU LIMITED, Kawasaki-shi, Kanagawa (JP)

(72) Inventor: Shuichi Chiba, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 368 days.

(21) Appl. No.: 14/590,164

(22) Filed: Jan. 6, 2015

(65) Prior Publication Data

US 2015/0220315 A1 Aug. 6, 2015

(30) Foreign Application Priority Data

Jan. 31, 2014 (JP) .................................. 2014-017204

(51) Int. Cl.
G06F 9/45 (2006.01)
G06F 9/30 (2006.01)

(52) U.S. Cl.
CPC ............... *G06F 8/433* (2013.01); *G06F 8/40* (2013.01); *G06F 8/453* (2013.01); *G06F 8/456* (2013.01); *G06F 9/30145* (2013.01)

(58) Field of Classification Search
None
See application file for complete search history.

(56) References Cited

U.S. PATENT DOCUMENTS

| | | | |
|---|---|---|---|
| 7,802,076 B2 | 9/2010 | Almog et al. | |
| 2006/0195828 A1 | 8/2006 | Nishi et al. | |
| 2013/0262835 A1* | 10/2013 | Arakawa | G06F 9/3887 712/220 |

FOREIGN PATENT DOCUMENTS

| | | |
|---|---|---|
| JP | 64-66734 A | 3/1989 |
| JP | 9-319617 A | 12/1997 |
| JP | 2006-243839 | 9/2006 |
| JP | 2011-165216 | 8/2011 |
| JP | 2013-206289 A | 10/2013 |
| WO | 2006/007193 | 1/2006 |

OTHER PUBLICATIONS

Japanese Office Action dated Aug. 1, 2017 for corresponding Japanese Patent Application No. 2014-017204, with English Translation, 6 pages.

* cited by examiner

*Primary Examiner* — Lewis A Bullock, Jr.
*Assistant Examiner* — Mark Gooray
(74) *Attorney, Agent, or Firm* — Fujitsu Patent Center

(57) ABSTRACT

A compiling apparatus generates a dependency tree representing dependency relations among a plurality of instructions included in first code. The compiling apparatus detects, from the dependency tree, a partial tree including a first instruction, a second instruction, and a third instruction that depends on the operation results of the first and second instructions, and rewrites the instructions corresponding to the partial tree to a set of instructions including a plurality of complex instructions each of which causes a processor to perform a complex operation including a plurality of operations. The compiling apparatus generates second code on the basis of the dependency tree and the set of instructions.

4 Claims, 43 Drawing Sheets

DIVIDING METHOD

GROUPING METHOD

|  |  | 141 |
|---|---|---|
| (1) | $A0 = B0 \times C0$ | |
| (2) | $A1 = B1 \times C1$ | |
| (3) | $A2 = B2 \times C2$ | |
| (4) | $A3 = B3 \times C3$ | |
| (5) | $A4 = B4 \times C4$ | |
| (6) | $A5 = B5 \times C5$ | |
| (7) | $A6 = B6 \times C6$ | |
| (8) | $A7 = B7 \times C7$ | |
| (9) | $X0 = A0 + A4$ | |
| (10) | $X1 = A1 + A5$ | |
| (11) | $X2 = A2 + A6$ | |
| (12) | $X3 = A3 + A7$ | |
| (13) | $Z0 = X0 \times X2$ | |
| (14) | $Z1 = X1 \times X3$ | |

FIG. 7

SIMD INSTRUCTIONS

```
A0 | A1 = B0 | B1 × C0 | C1
A2 | A3 = B2 | B3 × C2 | C3
A4 | A5 = B4 | B5 × C4 | C5
A6 | A7 = B6 | B7 × C6 | C7
X0 | X1 = A0 | A1 + A4 | A5
X2 | X3 = A2 | A3 + A6 | A7
Z0 | Z1 = X0 | X1 × X2 | X3
```
142

FMA INSTRUCTIONS

```
A4 | A5 = B4 | B5 × C4 | C5
A6 | A7 = B6 | B7 × C6 | C7
X0 | X1 = B0 | B1 × C0 | C1 + A4 | A5
X2 | X3 = B2 | B3 × C2 | C3 + A6 | A7
Z0 | Z1 = X0 | X1 × X2 | X3
```
143

FMA INSTRUCTIONS

```
A4 = B4 × C4 + 0
A5 = B5 × C5 + 0
A6 = B6 × C6 + 0
A7 = B7 × C7 + 0
X0 = B0 × C0 + A4
X1 = B1 × C1 + A5
X2 = B2 × C2 + A6
X3 = B3 × C3 + A7
Z0 = X0 × X2 + 0
Z1 = X1 × X3 + 0
```
144

SIMD INSTRUCTIONS

```
A4 | A5 = B4 | B5 × C4 | C5 + 0 | 0
A6 | A7 = B6 | B7 × C6 | C7 + 0 | 0
X0 | X1 = B0 | B1 × C0 | C1 + A4 | A5
X2 | X3 = B2 | B3 × C2 | C3 + A6 | A7
Z0 | Z1 = X0 | X1 × X2 | X3 + 0 | 0
```
145

CONVERSION RULE TABLE 153

| RULE NO. | ORIGINAL | CONVERTED |
|---|---|---|
| 1 | (A + B) + (C + D) | ((A × 1 + B) × 1 + C) × 1 + D |
| 2 | (A + B) + (C × D) | (C × D + A) × 1 + B |
| 3 | (A + B) × (C + D) | (A × 1 + B) × (C × 1 + D) + 0 |
| 4 | (A + B) × (C × D) | ((A × 1 + B) × C + 0) × D + 0 |
| 5 | (A × B) + (C + D) | (A × B + C) × 1 + D |
| 6 | (A × B) + (C × D) | A × B + (C × D + 0) |
| 7 | (A × B) × (C + D) | ((C × 1 + D) × A + 0) × B + 0 |
| 8 | (A × B) × (C × D) | ((A × B + 0) × C + 0) × D + 0 |

FIG. 25

FMA NORMALIZATION PATTERN 1

FMA NORMALIZATION PATTERN 2

| TREE ID | BASE POINT NO. | LEVEL | INSTRUCTION NO. |
|---|---|---|---|
| 1 | 6 | 4 | 1, 2, 3, 4, 5, 6 |
| 2 | 12 | 4 | 7, 8, 9, 10, 11, 12 |
| 3 | 14 | 6 | 13, 14 |

CODING TABLE 155

| OPERATION | CODE |
|---|---|
| MULT | 1 |
| DIV | 2 |
| ADD | 3 |
| SUB | 4 |
| LOAD | 5 |
| STORE | 6 |
| FMADD | 7 |
| FNMADD | 8 |
| FMSUB | 9 |
| FNMSUB | 10 |

FIG. 32

PACK 1

EDGE 1: BASE POINT OF 6 +
BASE POINT OF 12

PACK 2

EDGE 2: BASE POINT OF 16 +
BASE POINT OF 20

PACK 3

EDGE 1: BASE POINT OF 6 +
BASE POINT OF 12

EDGE 2: BASE POINT OF 16 +
BASE POINT OF 20

FIG. 38

METHOD AND APPARATUS FOR COMPILING CODE BASED ON A DEPENDENCY TREE

CROSS-REFERENCE TO RELATED APPLICATION

This application is based upon and claims the benefit of priority of the prior Japanese Patent Application No. 2014-17204, filed on Jan. 31, 2014, the entire contents of which are incorporated herein by reference.

FIELD

The embodiments discussed herein relate to a method and apparatus for compiling.

BACKGROUND

Software engineers mainly use a high-level language, such as the C language, as a programming language to develop computer software. Source code written in the high-level language is converted into object code by a compiler. The object code is code that is executable by processors, such as a Central Processing Unit (CPU). Some compilers may perform a so-called optimization process so as to generate object code having high execution efficiency (for example, short execution time and low memory usage). The optimization process includes combining two or more of basic instructions for addition, subtraction, multiplication, division, load, store, and the like, into one equivalent instruction, so as to reduce the number of instructions in the object code.

Some processors are able to execute Single Instruction Multiple Data (SIMD) instructions. When receiving a SIMD instruction, a processor performs the same type of operations using different data in parallel. For example, assume that data A1 and data A2 are stored in a SIMD register s1, and data B1 and data B2 are stored in a SIMD register s2. When receiving a SIMD instruction for s1+s2, a processor performs two additions, A1+B1 and A2+B2, in parallel. In the case of generating object code for this processor to execute, a compiler may perform an optimization process by converting two or more instructions that specify the same operation type and are executable in parallel into a SIMD instruction.

Further, some processors may be able to execute Fused Multiply and Add or Floating point Multiply and Add (FMA) instructions. Assume now that there are data A, B, and C. When receiving a FMA instruction, a processor performs a multiplication and an addition, A×B+C. In the case of generating object code for this processor to execute, a compiler may perform an optimization process by combining an instruction for multiplication and an instruction for addition using the result of the multiplication into a FMA instruction. Still further, some processors may be able to execute SIMD-FMA instructions, which are a combination of SIMD and FMA. For example, assume that data A1 and data A2 are stored in a SIMD register s1, data B1 and data B2 are stored in a SIMD register s2, and data C1 and data C2 are stored in a SIMD register s3. When receiving a SIMD-FMA instruction for s1×s2+s3, the processor performs two operations, A1×B1+C1 and A2×B2+C2, in parallel.

For performing such an optimization process, there is proposed a computer system that uses a trace dependency tree representing dependency relations among a plurality of instructions. This computer system searches the trace dependency tree for two or more instructions that specify the same operation type and belong to the same level, and converts the found two or more instructions into one SIMD instruction.

Please see, for example, International Publication Pamphlet No. WO 2006/007193.

A dependency tree that represents dependency relations among the instructions included in code prior to optimization may be a large-scale tree, including a variety of basic instructions for addition, subtraction, multiplication, division, load, store, and the like. To find combinations of two or more instructions that are convertible into another kind of instructions, such as SIMD instructions, searching such a dependency tree may need a large amount of computation. Therefore, it may take a long time to perform an optimization process. For example, in the case where a dependency tree has many instructions that specify the same operation type at the same level, there are many combination candidates of instructions to be converted into SIMD instructions, and therefore a large amount of computation is needed to find a conversion pattern that achieves high execution efficiency.

SUMMARY

According to one aspect, there is provided a non-transitory computer-readable medium storing therein a compiling program that causes a computer to execute a process including: generating a dependency tree representing dependency relations among a plurality of instructions included in first code; detecting a partial tree from the dependency tree, and rewriting instructions corresponding to the partial tree to a set of instructions, the instructions corresponding to the partial tree including a first instruction, a second instruction, and a third instruction, the third instruction depending on operation results of the first instruction and the second instruction, the set of instructions including a plurality of complex instructions each causing a processor to perform a complex operation that includes a plurality of operations; and generating second code based on the dependency tree and the set of instructions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a series of instructions including additions and multiplications;

FIG. 25 illustrates an example of a conversion rule table;

FIG. 29 illustrates an example of base point data;

FIG. 32 illustrates an example of a coding table;

FIG. 38 illustrates an example of pack data candidates;

DESCRIPTION OF EMBODIMENTS

Figure 1:
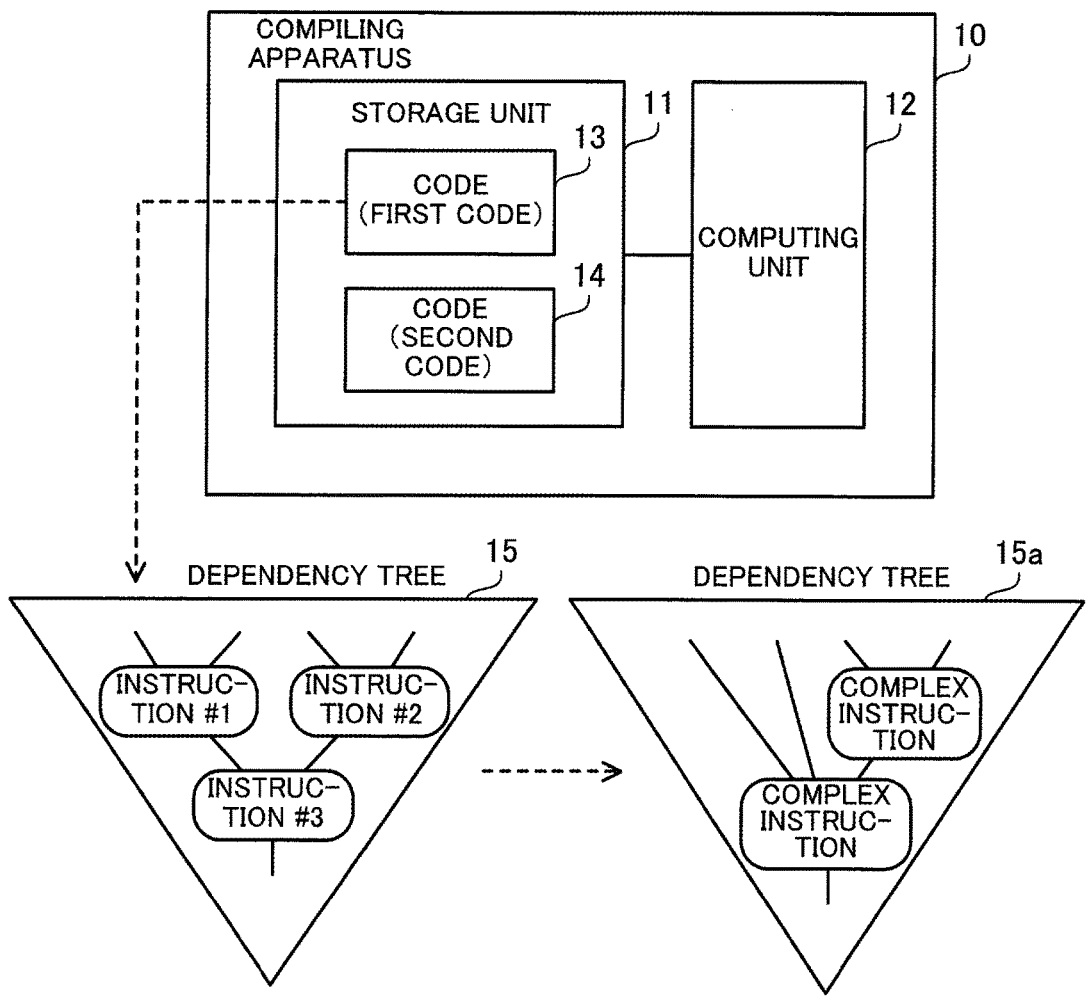
FIG. 1 illustrates an example of a compiling apparatus according to a first embodiment.

Several embodiments will be described below with reference to the accompanying drawings, wherein like reference numerals refer to like elements throughout.

First Embodiment

FIG. 1 illustrates an example of a compiling apparatus according to a first embodiment.

A compiling apparatus 10 converts (compiles) source code written in a high-level language, such as the C language, into object code, which is executable by processors. The compiling apparatus 10 may be a computer that executes software for compiling. The compiling apparatus 10 or software for compiling may be called a "compiler". Alternatively, the compiling apparatus 10 may be a client device serving as a terminal device that is operated by a user, or a server apparatus that is accessible from client devices. In addition, a processor that executes the generated object code may be provided in the compiling apparatus 10 or another computer.

The compiling apparatus 10 includes a storage unit 11 and a computing unit 12. The storage unit 11 may be a volatile storage device, such as a Random Access Memory (RAM), or a non-volatile storage device, such as a Hard Disk Drive (HDD). The computing unit 12 is, for example, a processor. The processor may be a CPU or a Digital Signal Processor (DSP) or may include an Application Specific Integrated Circuit (ASIC), Field Programmable Gate Array (FPGA), or others. The processor may execute programs stored in a storage device (for example, storage unit 11), such as RAM. A set of two or more processors (multiprocessor) may be called a "processor".

The storage unit 11 stores therein code 13 (first code) and code 14 (second code). The code 13 is, for example, source code or intermediate code, which is generated from source code through front-end processing including lexical analysis, syntactic analysis, and so on. The code 14 is, for example, assembly code or object code corresponding to the code 13.

The computing unit 12 obtains the code 13 from the storage unit 11, performs back-end processing including an optimization process on the code 13 to generate the code 14 corresponding to the code 13, and then stores the code 14 in the storage unit 11. In the optimization process, the computing unit 12 generates a dependency tree 15 representing dependency relations among the plurality of instructions included in the code 13. The instructions included in the dependency tree 15 are basic instructions for, for example, addition, subtraction, multiplication, division, load, store, and the like.

After generating the dependency tree 15, the computing unit 12 finds partial trees satisfying predetermined conditions from the dependency tree 15. The predetermined conditions are that a partial tree includes an instruction #1 (first instruction), an instruction #2 (second instruction), and an instruction #3 (third instruction) that depends on the operation results of the instructions #1 and #2. The instructions #1 and #2 each have, for example, two or more input operands, and perform four arithmetic operations, such as addition, subtraction, multiplication, division, etc. The instruction #3 has, for example, input operands that refer to the operation results of the instructions #1 and #2, and performs four arithmetic operations, such as addition, subtraction, multiplication, division, etc. Partial trees to be detected may be called triangle partial trees.

After detecting a partial tree, the computing unit 12 rewrites the detected partial tree using a complex instruction, so that the dependency tree 15 is transformed into a dependency tree 15a. Each complex instruction causes a processor to perform a complex operation including a plurality of operations (for example, different types of operations). One example of complex instructions is a FMA instruction for calculating A×B+C, which is a combination of multiplication and addition using input operands A, B, and C. A group of FMA-like instructions may include an instruction for calculating A×B−C, which is a combination of multiplication and subtraction.

A partial tree is transformed using a single complex instruction or a combination of two or more complex instructions. It is preferable that the number of complex instructions is fewer than the number of instructions originally included in the partial tree. It is also preferable that the partial tree is transformed such as to reduce the number of instructions at the same depth from the root node. Furthermore, it is also preferable that the original partial tree, even including instructions that specify different operation types, is transformed using one type of complex instructions to express the operations of the partial tree. To transform the partial tree, the computing unit 12 may use conversion rules according to the operation types of the instructions #1, #2, and #3.

For example, the instructions #1 and #2 perform multiplications and the instruction #3 performs an addition. Assume now that a partial tree for calculating (A×B)+(C×D) using data A, B, C, and D is detected. In this case, the computing unit 12 transforms this partial tree using, for example, two FMA instructions, A×B+(C×D+0)=FMA(A, B, FMA(C, D, 0)). Compared with the original partial tree, such conversion rules reduce the number of instructions, also reduce the number of instructions existing at the same depth (two instructions exist at different depths), and produce only one type of instructions, i.e., FMA instructions.

After the dependency tree 15 is transformed into the dependency tree 15a, the computing unit 12 generates the code 14 on the basis of the dependency tree 15a including complex instructions. The generated code 14 includes the complex instructions instead of the instructions #1, #2, and #3. In addition, the computing unit 12 may compare the dependency tree 15a with another dependency tree that has no dependency relations with the dependency tree 15a and includes complex instructions, and convert complex instructions included in the dependency tree 15a and complex instructions included in the other dependency tree into parallel instructions. Each parallel instruction causes a processor to execute two or more complex operations in parallel. Parallel instructions are, for example, SIMD-FMA instructions.

For example, assume that a partial tree of the dependency tree 15 is converted into FMA(A0, B0, FMA(C0, D0, 0)) and a partial tree of another dependency tree is converted into FMA(A1, B1, FMA(C1, D1, 0)). In this case, the computing unit 12 converts FMA(C0, D0, 0)=X0 and FMA (C1, D1, 0)=X1 into a SIMD-FMA instruction and also converts FMA(A0, B0, X0) and FMA(A1, B1, X1) into a SIMD-FMA instruction.

As described above, the compiling apparatus 10 of the first embodiment detects a triangle partial tree including the instructions #1, #2, and #3 from the dependency tree 15, and transforms the partial tree using complex instructions to thereby generate the dependency tree 15a. Then, the compiling apparatus 10 performs an optimization process, including conversion to FMA, conversion to SIMD, and the like, using the dependency tree 15a including the complex instructions. This approach is expected that the generated dependency tree 15a has fewer instructions at the same depth than the dependency tree 15, so that the number of combination patterns of instructions is reduced. This approach is also expected that many instructions included in the dependency tree 15a are the same type of complex instructions, which simplifies instruction scheduling even in the case where different types of instructions have different numbers of execution cycles. Therefore, compared with the case of searching the dependency tree 15, searching the dependency tree 15a needs a smaller amount of computation and a shorter processing time for the optimization process.

Further, many instructions included in the code 13 are converted into complex instructions, so that the code 14 has fewer instructions. In addition, since the complex instructions are of the same type, it is possible to produce a very efficient schedule with minimum idle time for the complex instructions. As a result, the code 14 has higher execution efficiency.

Second Embodiment

Figure 2:
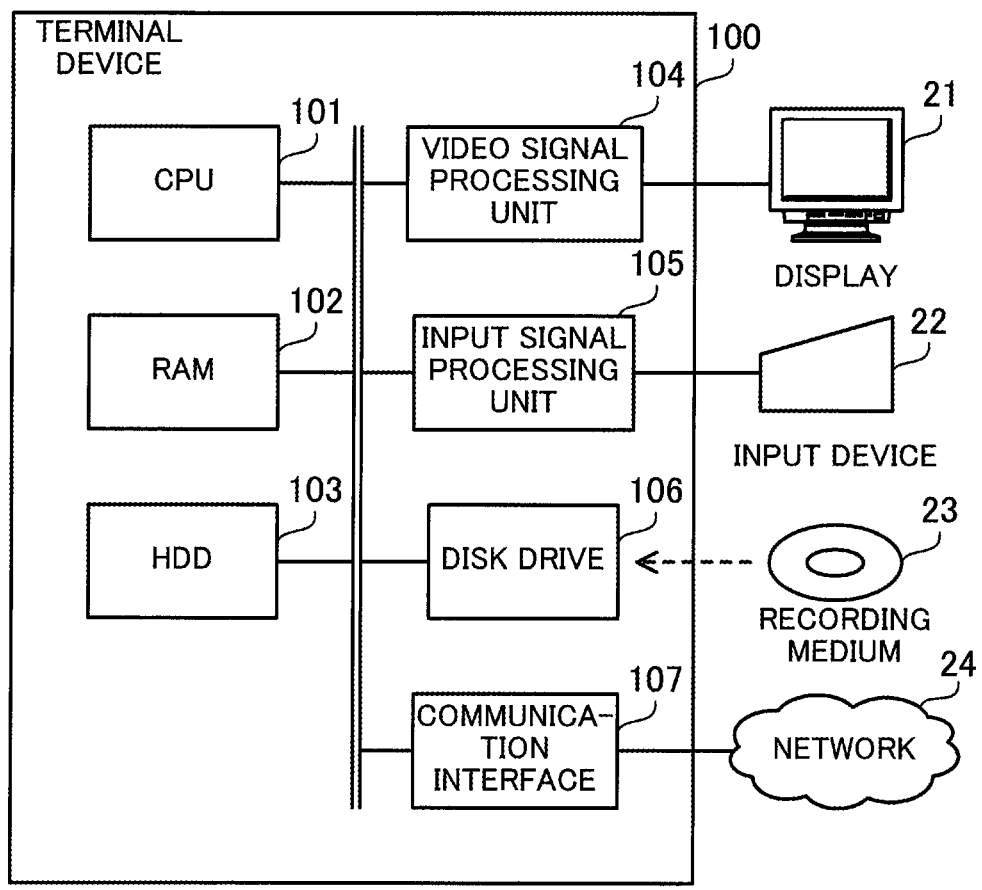
FIG. 2 is a block diagram illustrating an example of hardware of a terminal device.

FIG. 2 is a block diagram illustrating an example of hardware of a terminal device.

A terminal device 100 of the second embodiment compiles source code written in a high-level language into machine-readable object code. In addition, the terminal device 100 links a plurality of object codes to generate execution code for the terminal device 100 or another computer to execute. The compilation and linking, to be described in the second embodiment, may be performed by a server computer that is accessed from the terminal device 100.

The terminal device 100 includes a CPU 101, a RAM 102, a HDD 103, a video signal processing unit 104, an input signal processing unit 105, a disk drive 106, and a communication interface 107. The CPU 101 is an example of the computing unit 12 of the first embodiment. The RAM 102 and HDD 103 are examples of the storage unit 11 of the first embodiment.

The CPU 101 is a processor including a computing unit that executes instructions described in a program. The CPU 101 loads at least part of a program and data from the HDD 103 to the RAM 102, and then runs the program. In this connection, the CPU 101 may be provided with a plurality of processor cores, and the terminal device 100 may be provided with a plurality of processors. Furthermore, processes, to be described later, may be performed in parallel using a plurality of processors or processor cores.

The RAM 102 is a volatile memory that temporarily stores therein a program to be executed by the CPU 101 and data to be used in the computation of the CPU 101. In this connection, the terminal device 100 may be provided with another kind of memory than RAM or with a plurality of memories.

The HDD 103 is a non-volatile storage device that stores therein software programs, such as Operating System (OS), firmware, application software, etc., and data. In this connection, the terminal device 100 may be provided with another kind of storage device, such as a flash memory, Solid State Drive (SSD), etc., or with a plurality of storage devices.

The video signal processing unit 104 outputs images to a display 21 connected to the terminal device 100 in accordance with instructions from the CPU 101. As the display 21, a Cathode Ray Tube (CRT) display, a Liquid Crystal Display (LCD), or the like may be used.

The input signal processing unit 105 obtains an input signal from an input device 22 connected to the terminal device 100, and outputs the input signal to the CPU 101. As the input device 22, a pointing device, such as a mouse, a touch panel, etc., a keyboard, or the like may be used.

The disk drive 106 is a driving device that reads programs and data from a recording medium 23. As the recording medium 23, for example, a magnetic disk, such as a flexible disk (FD), a HDD, etc., an optical disc, such as a Compact Disc (CD), a Digital Versatile Disc (DVD), etc., a Magneto-Optical disk (MO), etc., may be used. For example, the disk drive 106 stores programs and data read from the recording medium 23 into the RAM 102 or HDD 103 in accordance with instructions from the CPU 101.

The communication interface 107 enables communication with other computers over a network 24. The communication interface 107 may be a wired communication interface connected to a wired network or a wireless communication interface connected to a wireless network.

Figure 3:
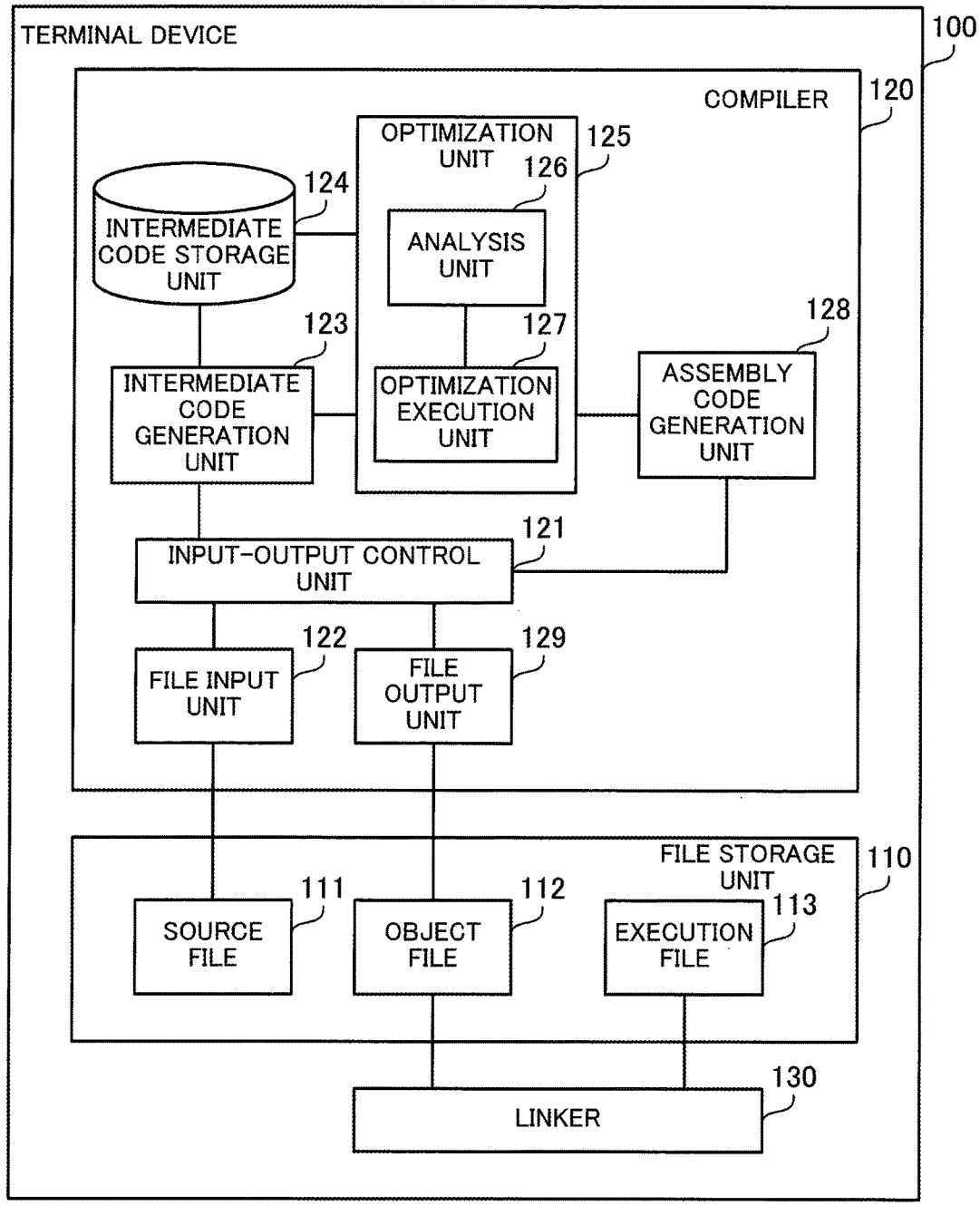
FIG. 3 is a block diagram illustrating an example of software to be executed by the terminal device.

FIG. 3 is a block diagram illustrating an example of software to be executed by the terminal device.

The terminal device 100 includes a file storage unit 110, a compiler 120, and a linker 130. The file storage unit 110 may be implemented as, for example, a storage area prepared in the RAM 102 or HDD 103. The compiler 120 and linker 130 may be implemented as, for example, program modules to be executed by the CPU 101.

The file storage unit 110 stores a source file 111, an object file 112, and an execution file 113. The source file 111 stores source code written in a high-level language. The object file 112 stores machine-readable object code that may include SIMD instructions, FMA instructions, and SIMD-FMA instructions. The execution file 113 is an executable file by a processor that has specific architecture to execute SIMD instructions, FMA instructions, and SIMD-FMA instructions. In this connection, the CPU 101 may or may not be able to execute the execution file 113.

The compiler 120 reads the source file 111 from the file storage unit 110, converts the obtained source code into object code, and stores the object file 112 in the file storage unit 110. To this end, the compiler 120 includes an input-output control unit 121, a file input unit 122, an intermediate code generation unit 123, an intermediate code storage unit 124, an optimization unit 125, an assembly code generation unit 128, and a file output unit 129.

The input-output control unit 121 selects an input-output method according to a file type, and controls the file input unit 122 and the file output unit 129. The file input unit 122 opens the source file 111 in response to an instruction from the input-output control unit 121, and reads source code from the source file 111. The intermediate code generation unit 123 analyzes the source code read by the file input unit 122 to translate the source code into intermediate code written in an intermediate language, which is locally used by the compiler 120, and stores the intermediate code in the intermediate code storage unit 124. The analysis of source code includes lexical analysis, syntactic analysis, semantic analysis, etc. The intermediate code storage unit 124 is, for example, a storage area prepared in the RAM 102, and stores the intermediate code.

The optimization unit 125 optimizes intermediate code stored in the intermediate code storage unit 124 in order to improve the execution efficiency (for example, to speed up execution). The optimization unit 125 includes an analysis unit 126 and an optimization execution unit 127. The analysis unit 126 analyzes the intermediate code to determine an optimization method. When determining the optimization method, the analysis unit 126 also determines combinations of instructions to be converted into SIMD instructions, FMA instructions, or SIMD-FMA instructions, from the instructions included in the intermediate code. The optimization execution unit 127 optimizes the intermediate code with the optimization method determined by the analysis unit 126. In the optimization, the optimization execution unit 127 converts the instructions included in the intermediate code into SIMD instructions, FMA instructions, or SIMD-FMA instructions.

Conversion of non-SIMD instructions included in intermediate code into SIMD instructions may be called "conversion to SIMD". Conversion of non-FMA instructions included in intermediate code into FMA instructions may be called "conversion to FMA". Conversion into SIMD-FMA instructions is a combination of conversion to SIMD and conversion to FMA, and may be called "conversion to SIMD-FMA".

The assembly code generation unit 128 converts the optimized intermediate code into assembly code that is written in a low-level assembly language. The file output unit 129 generates the object file 112 in response to an instruction from the input-output control unit 121. The file output unit 129 then translates the assembly code generated by the assembly code generation unit 128 into object code, and writes the object code to the object file 112.

The linker 130 reads the object file 112 from the file storage unit 110, and analyzes the object code to detect other object files and libraries to be referenced. The linker 130 then links the object file 112 with the detected object files and libraries to generate the execution file 113. In this connection, the functions of the linker 130 may be integrated in the compiler 120.

The following describes how to execute a SIMD instruction and a SIMD-FMA instruction.

Figure 4:
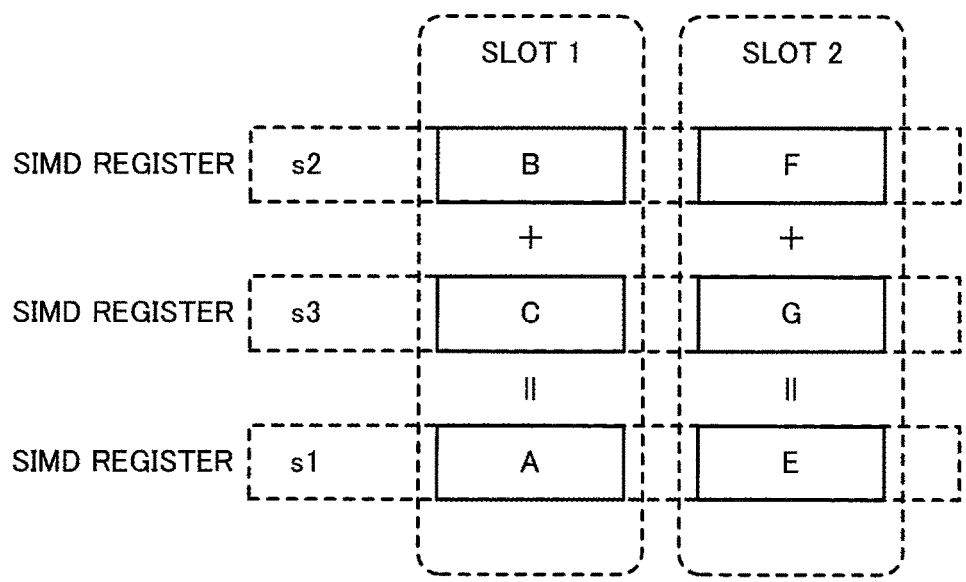
FIG. 4 illustrates an example of a relation between a SIMD instruction and SIMD registers.

FIG. 4 illustrates an example of a relation between a SIMD instruction and SIMD registers.

A processor that is able to execute SIMD instructions includes SIMD registers that store a combination of data to be processed in parallel. Each SIMD register includes as many subregisters as the degree of parallelism, which is determined according to the processor architecture (the number of the same type of operations that are executable in parallel). FIG. 4 illustrates the case where the degree of parallelism is two.

For example, as illustrated in FIG. 4, consider the case of converting two instructions, A=B+C and E=F+G, into a single SIMD instruction, s1=s2+s3. Data B, data F, data C, and data G are stored in the subregister 1 of the SIMD register s2, the subregister 2 of the SIMD register s2, the subregister 1 of the SIMD register s3, and the subregister 2 of the SIMD register s3, respectively. In this case, the SIMD instruction performs two additions in parallel to thereby calculate data A and E, which are then stored in the subregisters 1 and 2 of the SIMD register s1, respectively.

In this connection, a set of subregisters located at the corresponding positions is called a slot. More specifically, the subregisters 1 of the SIMD registers s1, s2, and s3 belong to a slot 1, and the subregisters 2 of the SIMD registers s1, s2, and s3 belong to a slot 2. In a SIMD instruction, one operation is performed using a plurality of subregisters belonging to the same slot.

Figure 5A:
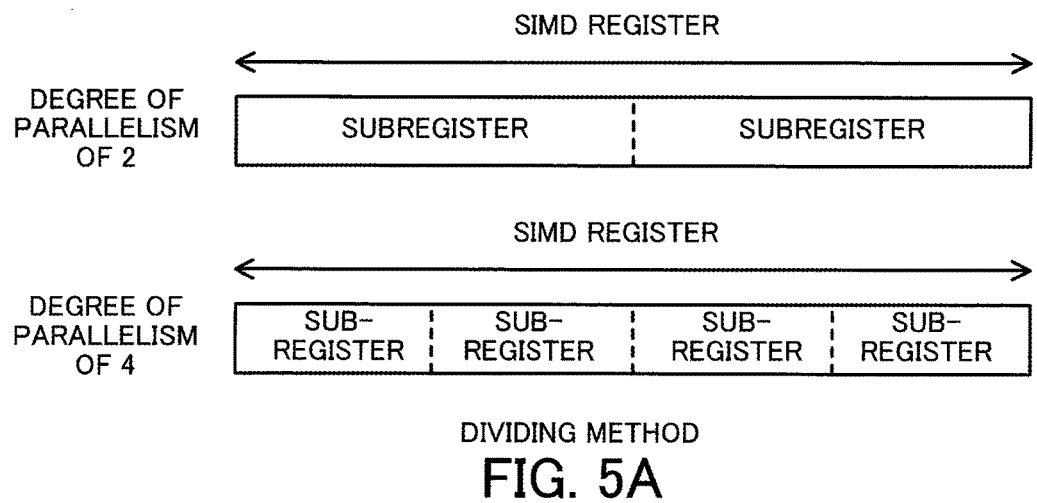
FIGS. 5A and 5B illustrate examples of implementation of SIMD registers.
Figure 5B:
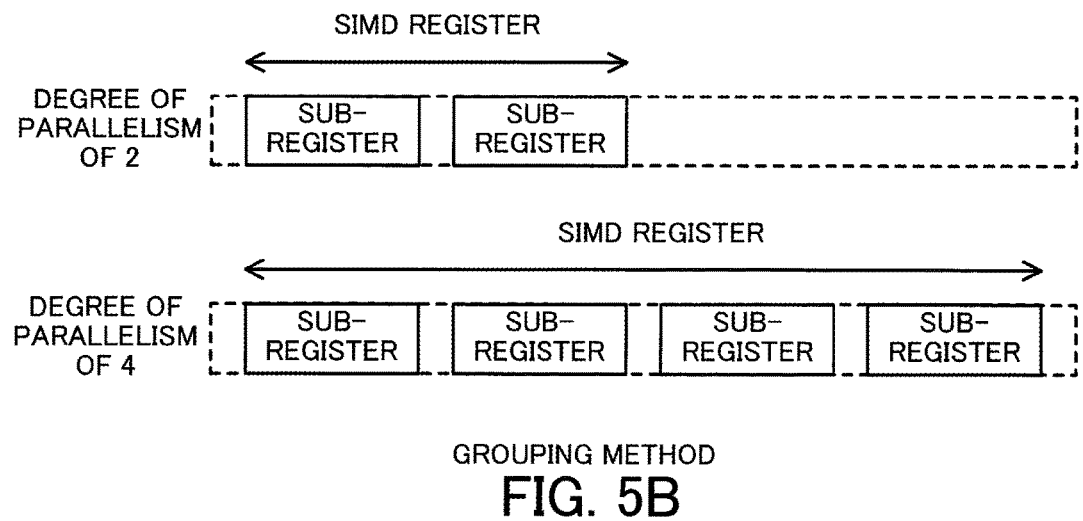

FIGS. 5A and 5B illustrate examples of implementation of SIMD registers.

For implementing SIMD registers in a processor, for example, there are a dividing method as illustrated in FIG. 5A and a grouping method as illustrated in FIG. 5B.

The dividing method is to logically divide one large physical register into a plurality of subregisters of the same size. In the case where the degree of parallelism is two, the storage area of the physical register is divided into halves. In the case where the degree of parallelism is four, the storage area of the physical register is divided into four. In the case where the size of a physical register is fixed, the higher the degree of parallelism, the smaller the number of bits in each subregister. In this dividing method, a SIMD register refers to a physical register, and a subregister refers to a logical register.

On the other hand, the grouping method is to form a SIMD register by grouping and using as subregisters a plurality of physical registers with the same number of bits. In the case where the degree of parallelism is two, a set of two physical registers is used as a SIMD register. In the case where the degree of parallelism is four, a set of four physical registers is used as a SIMD register. In the case where physical registers of the same size are used, the higher the degree of parallelism, the greater the number of bits in a SIMD register. In this grouping method, a SIMD register refers to a logical register, and a subregister refers to a physical register.

Figure 6:
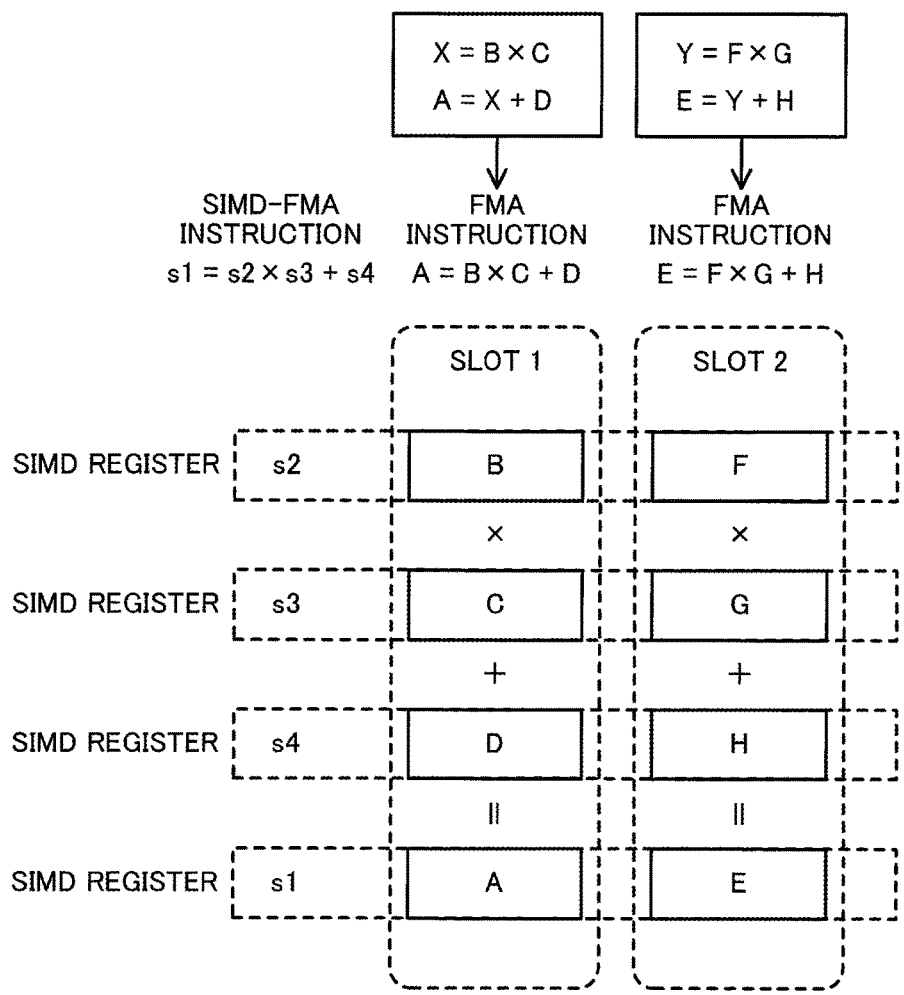
FIG. 6 illustrates an example of a combination of conversion to SIMD and conversion to FMA.

FIG. 6 illustrates an example of a combination of conversion to SIMD and conversion to FMA.

A processor that is able to execute FMA instructions performs a multiplication-addition operation, i.e., performs a multiplication and then an addition using the result of the multiplication, in accordance with a single FMA instruction. For example, assuming that two instructions, X=B×C and A=X+D, are converted into a single FMA instruction, the processor computes A=B×C+D in accordance with the FMA instruction. In addition, assuming that two instructions, Y=F×G and E=Y+H, are converted into a single FMA instruction, the processor computes E=F×G+H in accordance with the FMA instruction.

Further, the processor that is able to execute SIMD-FMA instructions is able to perform two or more multiplication-addition operations in parallel. That is to say, two or more FMA instructions may be converted to SIMD. For example, a processor that is able to execute SIMD-FMA instructions is provided with as many arithmetic computing units as the degree of parallelism, which is determined according to the processor architecture. FIG. 6 exemplifies the case where the degree of parallelism is two.

For example, as illustrated in FIG. 6, consider the case where two FMA instructions, A=B×C+D and E=F×G+H, are converted into a single SIMD-FMA instruction, s1=s2×s3+s4. In this case, data B and F are stored in the subregisters 1 and 2 of the SIMD register s2, respectively. Data C and G are stored in the subregisters 1 and 2 of the SIMD register s3, respectively, and data D and H are stored in the subregisters 1 and 2 of the SIMD register s4, respectively. The processor performs two multiplication-addition operations in parallel in response to the SIMD-FMA instruction to thereby compute data A and E, which are then stored in the subregisters 1 and 2 of the SIMD register s1, respectively.

The following describes an optimization process of converting a combination of basic instructions that are neither SIMD instructions nor FMA instructions into a SIMD-FMA instruction (conversion to SIMD-FMA).

FIG. 7 illustrates an example of a series of instructions including additions and multiplications.

For easy understanding, the following describes relations between instructions described in source code and an optimization process. Code 141 is included in the source file 111. Assume that the code 141 includes instructions 1 to 14, as illustrated in FIG. 7, in a single translation block. A translation block indicates a range of the code that the compiler 120 processes at a time. The compiler 120 performs the optimization process on the instructions included in the same translation block.

Each instruction 1 to 8, 13, and 14 performs a multiplication "×" of two operands, and each instruction 9 to 12 performs an addition "+" of two operands. The instructions 1 to 8, having no dependency relations with each other, are executable in parallel. The instructions 9 to 12, having no dependency relations with each other, are executable in parallel. The instructions 13 and 14, having no dependency relations with each other, are executable in parallel. On the other hand, the instruction 9 refers to the multiplication results of the instructions 1 and 5, and the instruction 10 refers to the multiplication results of the instructions 2 and 6. The instruction 11 refers to the multiplication results of the instructions 3 and 7, and the instruction 12 refers to the multiplication results of the instructions 4 and 8. The instruction 13 refers to the addition results of the instructions 9 and 11, and the instruction 14 refers to the addition results of the instructions 10 and 12.

Figure 8:
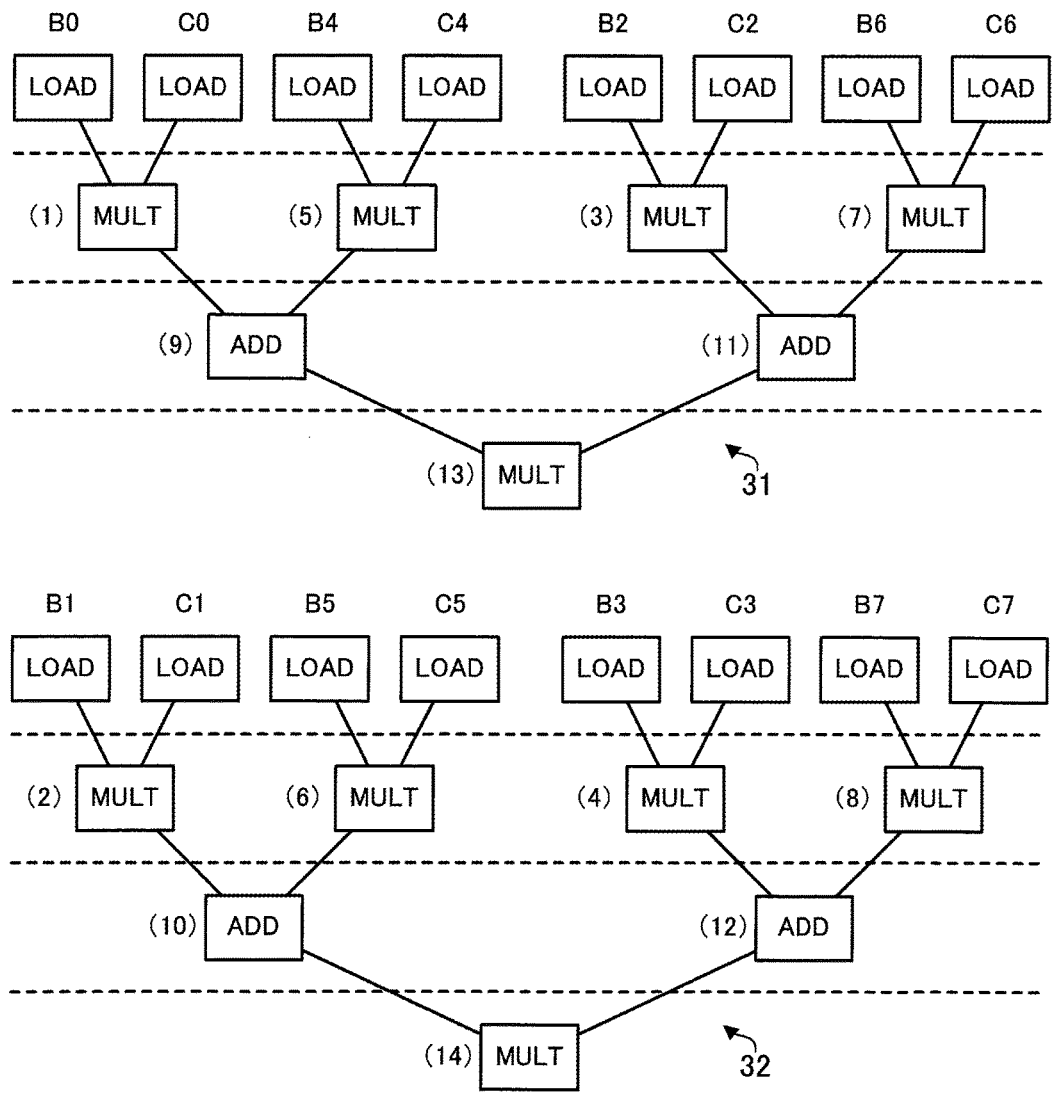
FIG. 8 illustrates an example of dependency trees corresponding to a series of instructions.

FIG. 8 illustrates an example of dependency trees corresponding to a series of instructions.

The compiler 120 generates, from the instructions 1 to 14 illustrated in FIG. 7, dependency trees 31 and 32 representing dependency relations among the instructions 1 to 14. The dependency tree 31 includes instructions 1, 3, 5, 7, 9, 11, and 13. As described earlier, the instructions 1, 3, 5, 7, and 13 are multiplication (MULT) instructions, and the instructions 9 and 11 are addition (ADD) instructions. The instruction 9 depends on the instructions 1 and 5, the instruction 11 depends on the instructions 3 and 7, and the instruction 13 depends on the instructions 9 and 11.

The dependency tree 32 includes instructions 2, 4, 6, 8, 10, 12, and 14. As described earlier, the instructions 2, 4, 6, 8, and 14 are multiplication (MULT) instructions, and the instructions 10 and 12 are addition (ADD) instructions. The instruction 10 depends on the instructions 2 and 6, the instruction 12 depends on the instructions 4 and 8, and the instruction 14 depends on the instructions 10 and 12. The instructions belonging to the dependency tree 31 and the instructions belonging to the dependency tree 32, having no dependency relations with each other, are executable in parallel.

Figure 9:
FIG. 9 illustrates an example of a series of SIMD-FMA instructions.

FIG. 9 illustrates an example of a series of SIMD-FMA instructions.

For example, in the case of optimizing the instructions 1 to 14 by directly searching the dependency trees 31 and 32, there is an idea that the compiler 120 generates SIMD-FMA instructions in the following manner.

First, the compiler 120 compares the dependency trees 31 and 32 with each other to search for combination patterns of an instruction of the dependency tree 31 and an instruction of the dependency tree 32. Instructions to be combined are convertible into a SIMD instruction, specify the same operation type, and exist at the same depth from the roots of their corresponding dependency trees. Note that the instructions 13 and 14 exist at the depth of 1, the instructions 9 to 12 exist at the depth of 2, and the instructions 1 to 8 exist at the depth of 3.

In this example, the compiler 120 combines the instructions 1 and 2 to generate a SIMD multiplication instruction, A0|A1=B0|B1×C0|C1. A0|A1 indicates that data A0 and A1 are stored in the same SIMD register. Similarly, the compiler 120 combines the instructions 3 and 4 to generate a SIMD multiplication instruction, combines the instructions 5 and 6 to generate a SIMD multiplication instruction, and combines the instructions 7 and 8 to generate a SIMD multiplication instruction. In addition, the compiler 120 combines the instructions 9 and 10 to generate a SIMD addition instruction, combines the instructions 11 and 12 to generate a SIMD addition instruction, and combines the instructions 13 and 14 to generate a SIMD multiplication instruction. As a result, code 142 including seven SIMD instructions is generated.

Next, the compiler 120 searches the code 142 for combination patterns of a SIMD multiplication instruction and a SIMD addition instruction. Such SIMD instructions to be combined are convertible into a SIMD-FMA instruction, and one of the SIMD instructions refers to the multiplication result of the other SIMD instruction (data to be output from the other SIMD multiplication instruction).

In this example, the compiler 120 combines the first and fifth SIMD instructions of the code 142 to generate a SIMD-FMA instruction, X0|X1=B0|B1×C0|C1+A4|A5. In addition, the compiler 120 combines the second and sixth SIMD instructions of the code 142 to generate a SIMD-FMA instruction, X2|X3=B2|B3×C2|C3+A6|A7. The third, fourth, and seventh SIMD instructions of the code 142 remain the same. As a result, code 143 including two SIMD-FMA instructions and three SIMD instructions is generated.

However, such conversion to SIMD-FMA has the following problem.

Considering that two dependency trees each have n instructions that specify the same operation type at the same depth from its corresponding root, there are $_nP_n$ combination patterns of instructions for the depth. The total number of combination patterns for the dependency trees is calculated as the sum of the numbers of combination patterns of all depths. Referring to FIG. 8, each dependency tree 31 and 32 has four multiplication instructions at the depth of three, two addition instructions at the depth of two, and one multiplication instruction at the depth of one. Therefore, there are 27 combination patterns, $_4P_4+_2P_2+_1P_1=24+2+1=27$. This search method remarkably increases the amount of computation and the memory usage with an increase in the scale of dependency trees, and therefore may take a long time.

In addition, the code 143 generated through the optimization includes a mix of two FMA instructions (SIMD-FMA instructions) and three non-FMA instructions (SIMD instructions). A percentage (FMA ratio) of FMA instructions to the instructions included in the code 143 is calculated as 40%. Different operation types of instructions have different numbers of execution cycles (the execution of instructions may need different numbers of clocks of a processor). A large variation in the operation type, that is, a large variation in the number of execution cycles for instructions, may make it difficult to produce an efficient schedule with minimum idle time. In addition, time will be taken to produce an appropriate schedule for enabling pipeline processing and so on.

To deal with the above, the second embodiment performs the optimization process using deformed dependency trees.

Figure 10:
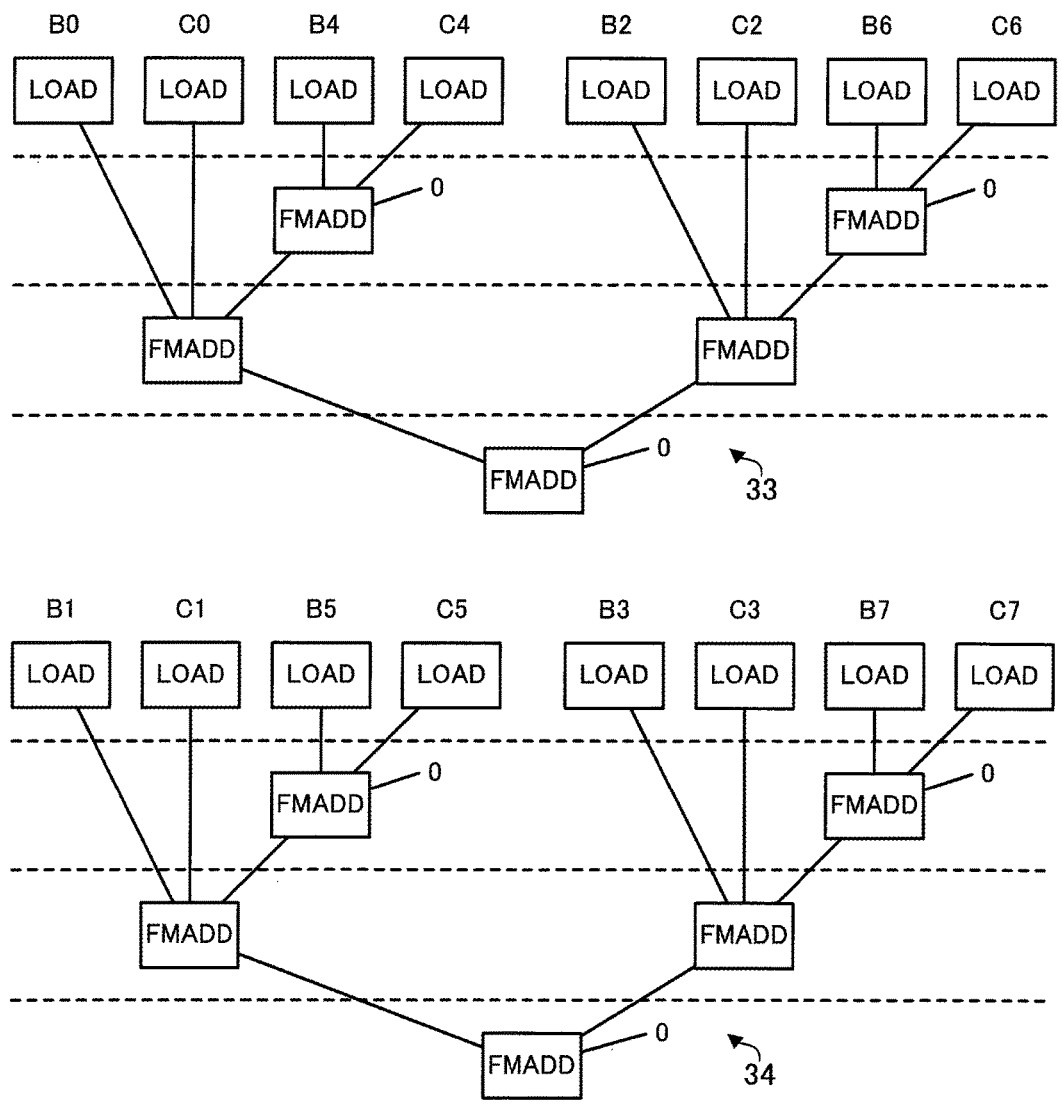
FIG. 10 illustrates an example of dependency trees subjected to FMA normalization.

FIG. 10 illustrates an example of dependency trees subjected to FMA normalization.

The compiler 120 deforms the above-described dependency tree 31 to a dependency tree 33, and deforms the above-described dependency tree 32 to a dependency tree 34. All of the instructions included in the dependency trees 31 and 32 are converted into the same type of instructions (FMA instructions).

The dependency tree 33 includes five FMA instructions that perform multiplication-addition operations (FMADD). The instruction 5 is converted into a FMA instruction, A4=B4×C4+0, and the instruction 7 is converted into a FMA instruction, A6=B6×C6+0. The instructions 1 and 9 are converted into a FMA instruction, X0=B0×C0+A4, and the instructions 3 and 11 are converted into a FMA instruction, X2=B2×C2+A6. The instruction 13 is converted into a FMA instruction, Z0=X0×X2+0. On the other hand, the dependency tree 34 includes five FMA instructions. The instruction 6 is converted into a FMA instruction, A5=B5×C5+0, and the instruction 8 is converted into a FMA instruction, A7=B7×C7+0. The instructions 2 and 10 are converted into a FMA instruction, X1=B1×C1+A5, and the instructions 4 and 12 are converted into a FMA instruction, X3=B3×C3+A7. The instruction 14 is converted into a FMA instruction, Z1=X1×X3+0.

That is to say, a combination of the multiplication instruction 1 and the addition instruction 9 that refers to the result of the multiplication is converted into a single FMA instruction. Each of a combination of the instructions 2 and 10, a combination of the instructions 3 and 11, and a combination of the instructions 4 and 12 is also converted into a single FMA instruction. In addition, the remaining multiplication instruction 5 is converted into a FMA instruction without changing the operation result, by adding zero to the multiplication result as a dummy addition. Similarly, by adding dummy additions, the instructions 6 to 8, 13, and 14 are converted into FMA instructions. Further, each remaining addition instruction may be converted into a FMA instruction by multiplying one of the operands by one as a dummy multiplication.

Figure 11:
FIG. 11 illustrates another example of SIMD-FMA instructions.

FIG. 11 illustrates another example of SIMD-FMA instructions.

Conversion of the dependency trees 31 and 32 into the dependency trees 33 and 34 substantially amounts to conversion of the code 141 into code 144 of FIG. 11. The code 144 includes ten FMA instructions as represented in the dependency trees 33 and 34. The compiler 120 compares the dependency trees 33 and 34 with each other to find combination patterns of instructions included in the dependency trees 33 and 34. Instructions to be combined are convertible to SIMD, specify the same operation type, and exist at the same depth. In this connection, all the instructions of the dependency trees 33 and 34 perform multiplication-addition operations (FMADD).

In this example, the compiler 120 combines the FMA instructions at the depth of three to generate SIMD-FMA instructions, A4|A5=B4|B5×C4|C5+0|0 and A6|A7=B6|B7×C6|C7+0|0. In addition, the compiler 120 combines the FMA instructions at the depth of two to generate SIMD-FMA instructions, X0|X1=B0|B1×C0|C1+A4|A5 and X2|X3=B2|B3×C2|C3+A6|A7. In addition, the compiler 120 combines the FMA instructions at the depth of one to generate a SIMD-FMA instruction, Z0|Z1=X0|X1×X2|X3+0|0. As a result, code 145 including five SIMD-FMA instructions is generated.

Each deformed dependency tree 33 and 34 includes two FMA instructions at the depth of three, two FMA instructions at the depth of two, and one FMA instruction at the depth of one. Therefore, for the optimization process, there are five patterns. This number of patterns is calculated as $_2P_2+_2P_2+_1P_1=2+2+1=5$. As compared with the case of using the original dependency trees 31 and 32, the optimization process needs a low amount of computation and low memory usage, which enables the compiler 120 to perform the optimization process at a high speed.

The optimized code 145 includes five SIMD-FMA instructions, and does not include any other operation types of instructions. The FMA ratio of the code 145 is 100%. Even different operation types of instructions have different numbers of execution cycles, a variation in the number of execution cycles between instructions is small and it is easy to produce an efficient schedule of instructions with minimum idle time. In addition, the scheduling of instructions is simple and time taken to search for an appropriate schedule is reduced.

The following describes how the compiler 120 performs SIMD optimization.

Figure 12:
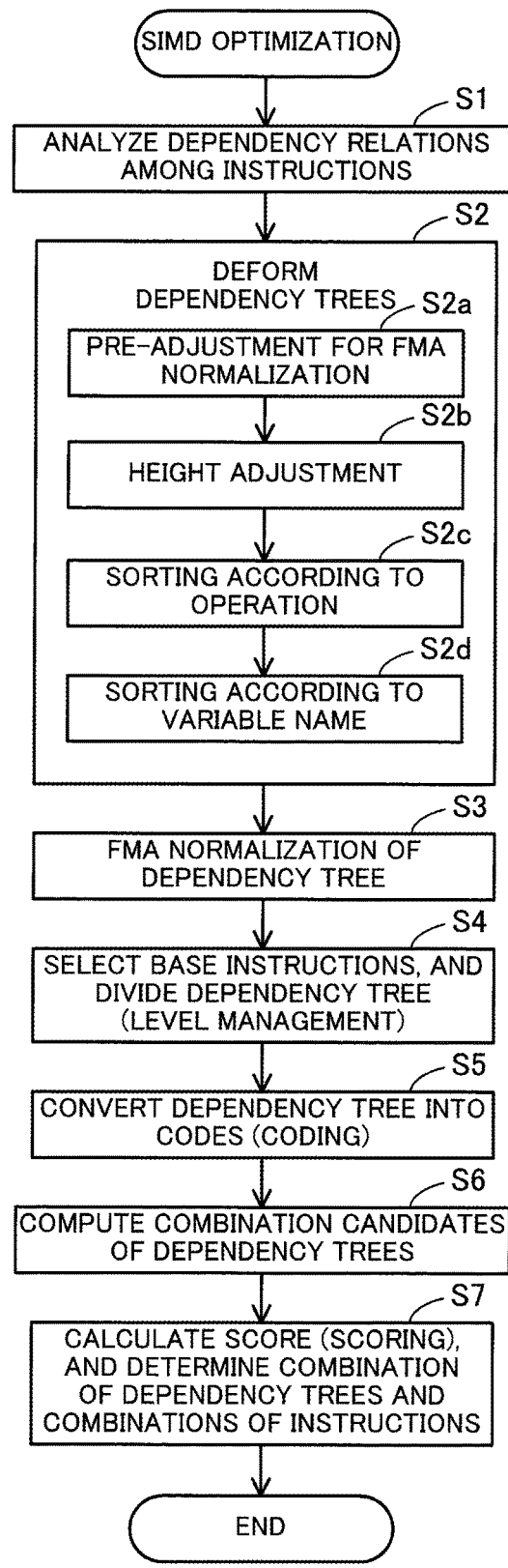
FIG. 12 is a flowchart illustrating an example of a procedure for SIMD optimization.

FIG. 12 is a flowchart illustrating an example of a procedure for SIMD optimization.

(S1) The analysis unit 126 reads intermediate code of one translation block from the intermediate code storage unit 124, and analyzes dependency relations among the instructions included in the read intermediate code. The analysis unit 126 then generates a plurality of dependency trees representing the dependency relations among the instructions.

(S2) The analysis unit 126 deforms at least one of the plurality of dependency trees generated at step S1 in order to make it easy to search for combination patterns of instructions. This step S2 includes the following steps S2a, S2b, S2c, and S2d.

(S2a) The analysis unit 126 performs pre-adjustment for FMA normalization, which is performed at the following step S3. The pre-adjustment for FMA normalization is to deform dependency trees without changing operation results so as to detect as many partial trees that are convertible into FMA instructions at step S3 as possible. (S2b) The analysis unit 126 inserts pseudo instructions in at least one of the plurality of dependency trees so that the dependency trees become the same height. (S2c) The analysis unit 126 sorts instructions existing at the same depth according to operation type in each dependency tree. (S2d) The analysis unit 126 sorts load instructions existing at the same depth according to the variable name of data to be read, in each dependency tree.

(S3) The analysis unit 126 performs FMA normalization on each dependency tree. In the FMA normalization, the analysis unit 126 detects two instructions (a multiplication instruction and an addition instruction that refers to the result of the multiplication) that form FMA, from a dependency tree, and converts the detected two instructions into a single FMA instruction. In addition, the analysis unit 126 detects a partial tree (a triangle partial tree to be described later), which may be represented as a combination of two or more FMA instructions, and rewrites the detected partial tree using two or more FMA instructions under conversion rules.

(S4) The analysis unit 126 selects one or more instructions that are base points from each dependency tree, and divides the dependency tree by using the selected base points as root nodes (level management) in order to make it easy to compare dependency trees with each other. The second embodiment uses store instructions for writing data to a RAM, as the instructions of base points.

(S5) The analysis unit 126 codes each dependency tree in order to compare instructions between the dependency trees efficiently. That is to say, the analysis unit 126 generates, for each dependency tree, coded data by arranging codes indicating the operation types according to the structure of the dependency tree.

(S6) The analysis unit 126 computes all combination candidates of dependency trees. The number of dependency trees belonging to one combination is equal to the degree of SIMD parallelism. For example, in the case where the degree of parallelism is two, the analysis unit 126 computes all combinations each made up of two dependency trees under predetermined conditions (for example, dependency trees to be combined need to have their base points at the same level, to have no dependency relations with each other, etc.). In this connection, steps S5 and S6 may be performed in reverse order or in parallel.

(S7) The analysis unit 126 calculates a score indicating the matching level of instructions by comparing the coded data generated at step S5 among the dependency trees of each combination candidate computed at step S6 (scoring). In this scoring, it is evaluated whether or not corresponding nodes of a plurality of dependency trees include instructions that perform the same type of operations. The analysis unit 126 determines a combination of dependency trees on the basis of the calculated scores, and determines to convert the instructions of corresponding nodes in a plurality of dependency trees belonging to the determined combination to SIMD.

The following describes an example of how to implement the procedure illustrated in FIG. 12. A procedure for generating dependency trees by analyzing dependency relations among instructions from intermediate code will first be described.

Figure 13:
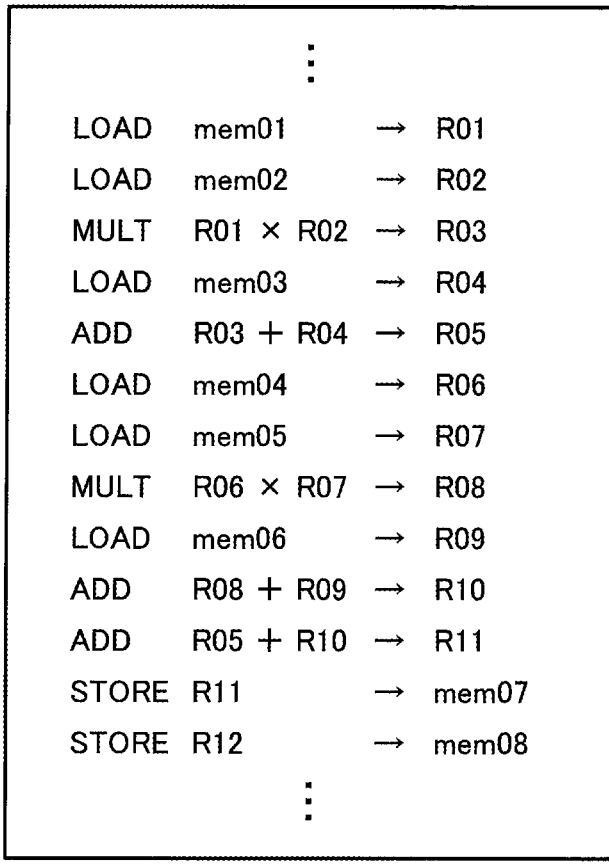
FIG. 13 illustrates an example of intermediate code including additions and multiplications.

FIG. 13 illustrates an example of intermediate code including additions and multiplications.

Intermediate code 146 is stored in the intermediate code storage unit 124. The intermediate code 146 includes instructions 1 to 13 in one translation block. The instructions 1, 2, 4, 6, 7, and 9 are load instructions (LOAD). The instructions 12 and 13 are store instructions (STORE). The instructions 3 and 8 are multiplication instructions (MULT), and the instructions 5, 10, and 11 are addition instructions (ADD).

The instruction 3 refers to data loaded by the instructions 1 and 2, the instruction 5 refers to data calculated by the instruction 3 and data loaded by the instruction 4, and the instruction 8 refers to data loaded by the instructions 6 and 7. The instruction 10 refers to data calculated by the instruction 8 and data loaded by the instruction 9, and the instruction 11 refers to data calculated by the instructions 5 and 10. The instruction 12 refers to data calculated by the instruction 11. The instruction 13 does not refer to any of data that is loaded or calculated by the instructions 1 to 12. In this connection, R01 to R12 in FIG. 13 denote logical registers, and mem01 to mem08 denote logical storage areas of a RAM.

Figure 14:
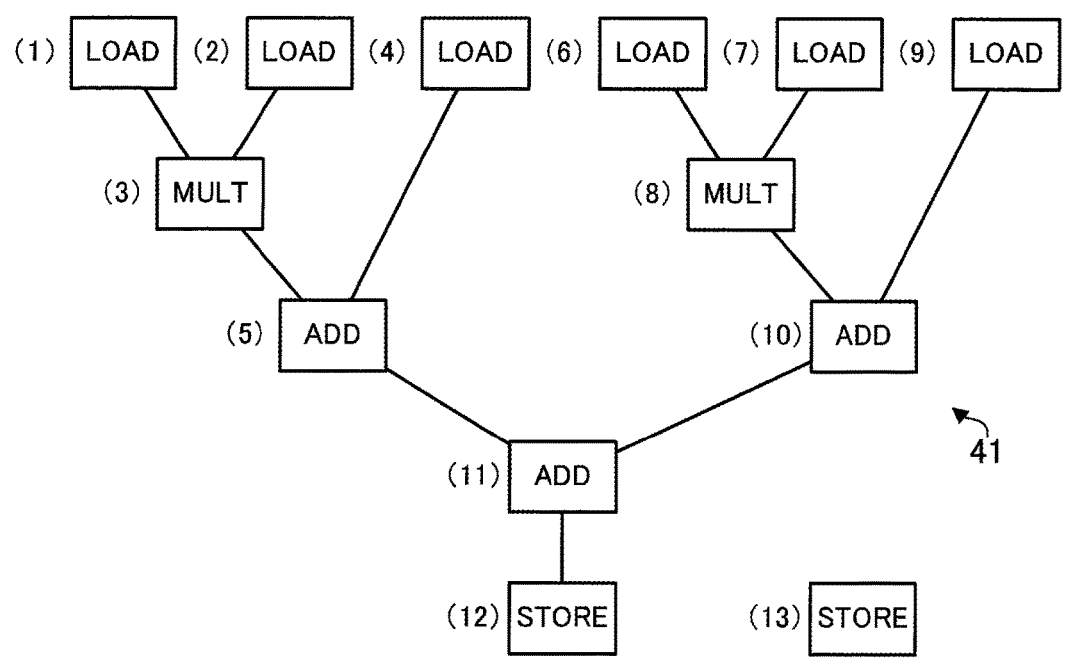
FIG. 14 illustrates an example of dependency trees corresponding to the intermediate code.

FIG. 14 illustrates an example of dependency trees corresponding to the intermediate code.

A dependency tree 41 is generated from the instructions 1 to 12 illustrated in FIG. 13. The instruction 13, having no dependency relations with the instructions 1 to 12, does not belong to the dependency tree 41. In the dependency tree 41, one instruction that depends on another instruction corresponds to a parent node, and the other instruction corresponds to a child node. The calculation is performed, starting with the leaf nodes of the dependency tree 41 and proceeding toward the root node. As illustrated in FIG. 14, the instruction 3 depends on the instructions 1 and 2, the instruction 5 depends on the instructions 3 and 4, the instruction 8 depends on the instructions 6 and 7, the instruction 10 depends on the instructions 8 and 9, the instruction 11 depends on the instructions 5 and 10, and the instruction 12 depends on the instruction 11.

Figure 15:
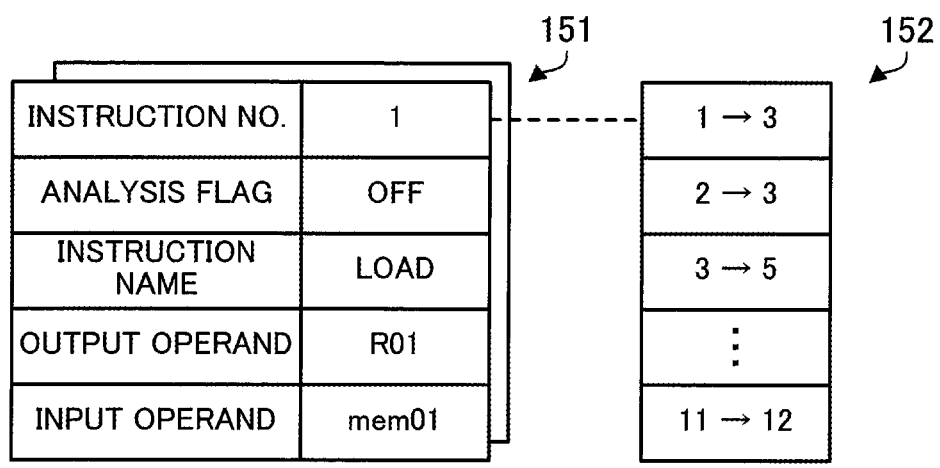
FIG. 15 illustrates an example of instruction data and dependency data.

FIG. 15 illustrates an example of instruction data and dependency data.

Instruction data 151 and dependency data 152 are generated by analyzing dependency relations.

The instruction data 151 includes, for each instruction, fields for instruction number (No.), analysis flag, instruction name, output operand, and input operand. An instruction number is a number identifying an instruction. An analysis flag indicates whether the instruction has been analyzed or not, and is used in analysis of dependency relations or another process. The initial value of the analysis flag is set to OFF. An instruction name is a name (ADD, SUB, MULT, DIV, LOAD, STORE, FMADD, etc.) identifying an operation type. The output operand field contains an identifier indicating a logical register or a storage area of a RAM used for the intermediate code 146, that is, an identifier indicating where to store data. The input operand field contains one or more identifiers indicating logical registers or storage areas of the RAM that store data to be referenced.

The dependency data 152 indicates one or more combinations of the instruction number of a definition instruction and the instruction number of a reference instruction. A definition instruction defines, as an output operand, a register or a storage area of the RAM to be referenced by another instruction. A reference instruction refers to, as an input operand, a register or a storage area of the RAM that is defined as an output operand by another instruction.

Figure 16:
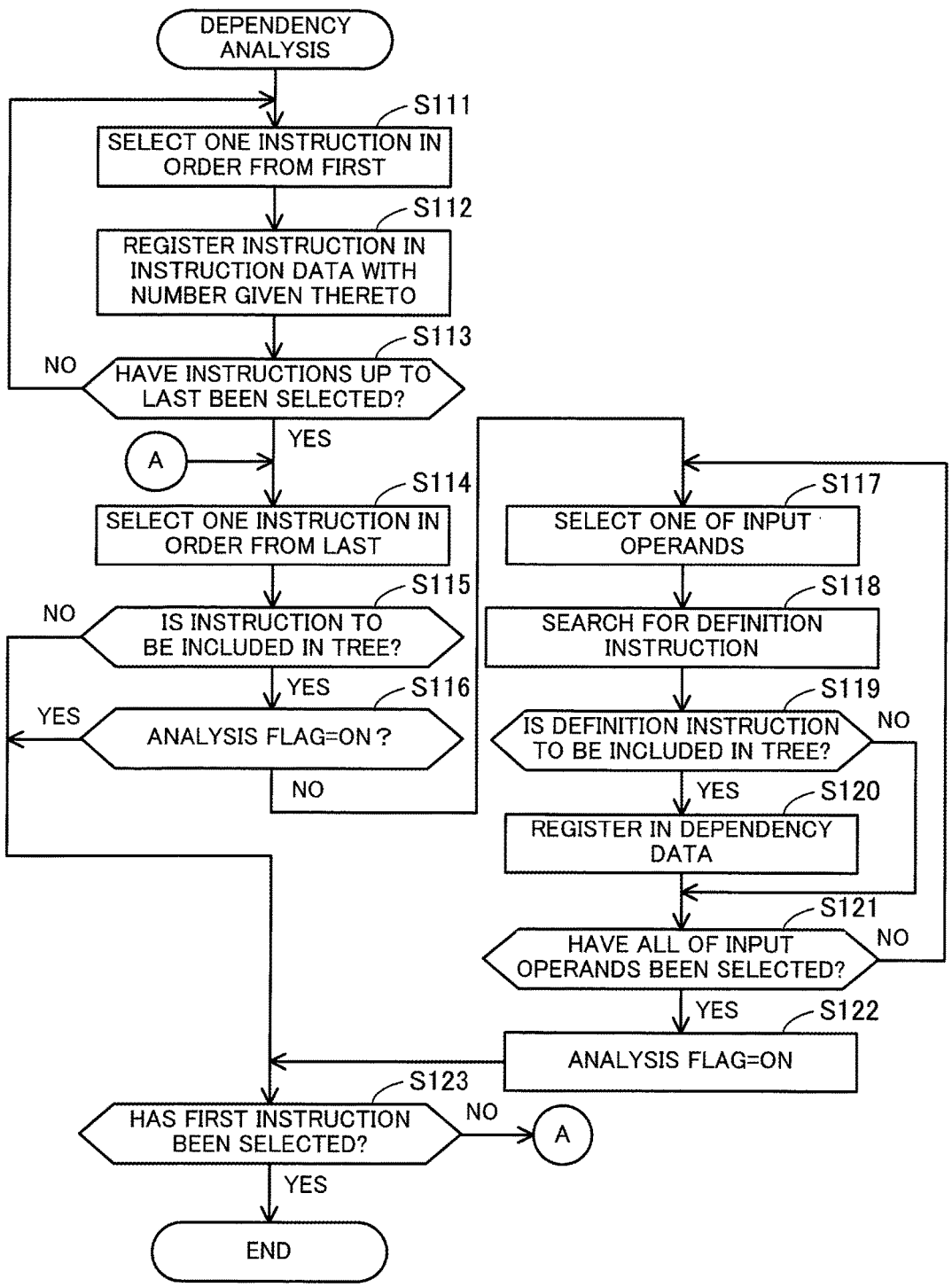
FIG. 16 is a flowchart illustrating an exemplary procedure for dependency analysis.

FIG. 16 is a flowchart illustrating an exemplary procedure for dependency analysis.

The process described by this flowchart is performed at the above-described step S1.

(S111) The analysis unit 126 selects one of instructions included in a translation block, preferentially in order from the first. (S112) The analysis unit 126 extracts the instruction name, output operand, and input operands from the selected instruction, and registers the instruction in the instruction data 151 with an instruction number given thereto. (S113) The analysis unit 126 determines whether all of the instructions up to the last in the translation block have been selected at step S111 or not. If all of the instructions have been selected, the process proceeds to step S114. If there is any unselected instruction, the process proceeds back to step S111.

(S114) The analysis unit 126 selects one of instructions included in the translation block, preferentially in order from the last. (S115) The analysis unit 126 determines whether to include the selected instruction in a dependency tree. If the selected instruction satisfies this condition, the process proceeds to step S116. Otherwise, the process proceeds to step S123. (S116) The analysis unit 126 determines whether the selected instruction has an analysis flag of ON or not (has been analyzed or not). If the analysis flag is ON, the process proceeds to step S123. If the analysis flag is OFF, on the other hand, the process proceeds to step S117

(S117) The analysis unit 126 selects one of the input operands of the instruction selected at step S114. (S118) The analysis unit 126 searches the instructions in the translation blocks for an instruction (definition instruction) whose output operand corresponds to the selected input operand. (S119) The analysis unit 126 determines whether or not the found definition instruction is to belong to the dependency tree of the current translation block (for example, whether or not the found definition instruction is not included in another translation block). If the definition instruction satisfies this condition, the process proceeds to step S120. Otherwise, the process proceeds to step S121. (S120) The analysis unit 126 registers the dependency relations of the instruction (reference instruction) selected at step S114 on the definition instruction found at step S118, in the dependency data 152.

(S121) The analysis unit 126 determines whether all of the input operands of the selected instruction have been selected at step S117 or not. If all of the input operands have been selected, the process proceeds to step S122. If there is any unselected input operand, the process proceeds back to step S117. (S122) The analysis unit 126 sets the analysis flag of the instruction selected at step S114 to ON. (S123) The analysis unit 126 determines whether all of the instructions up to the first in the translation block have been selected at step S114 or not. If all of the instructions have been selected, the process is completed. If there is any unselected instruction, the process proceeds back to step S114

The following describes how to deform a dependency tree in the pre-adjustment for FMA normalization.

Figure 17:
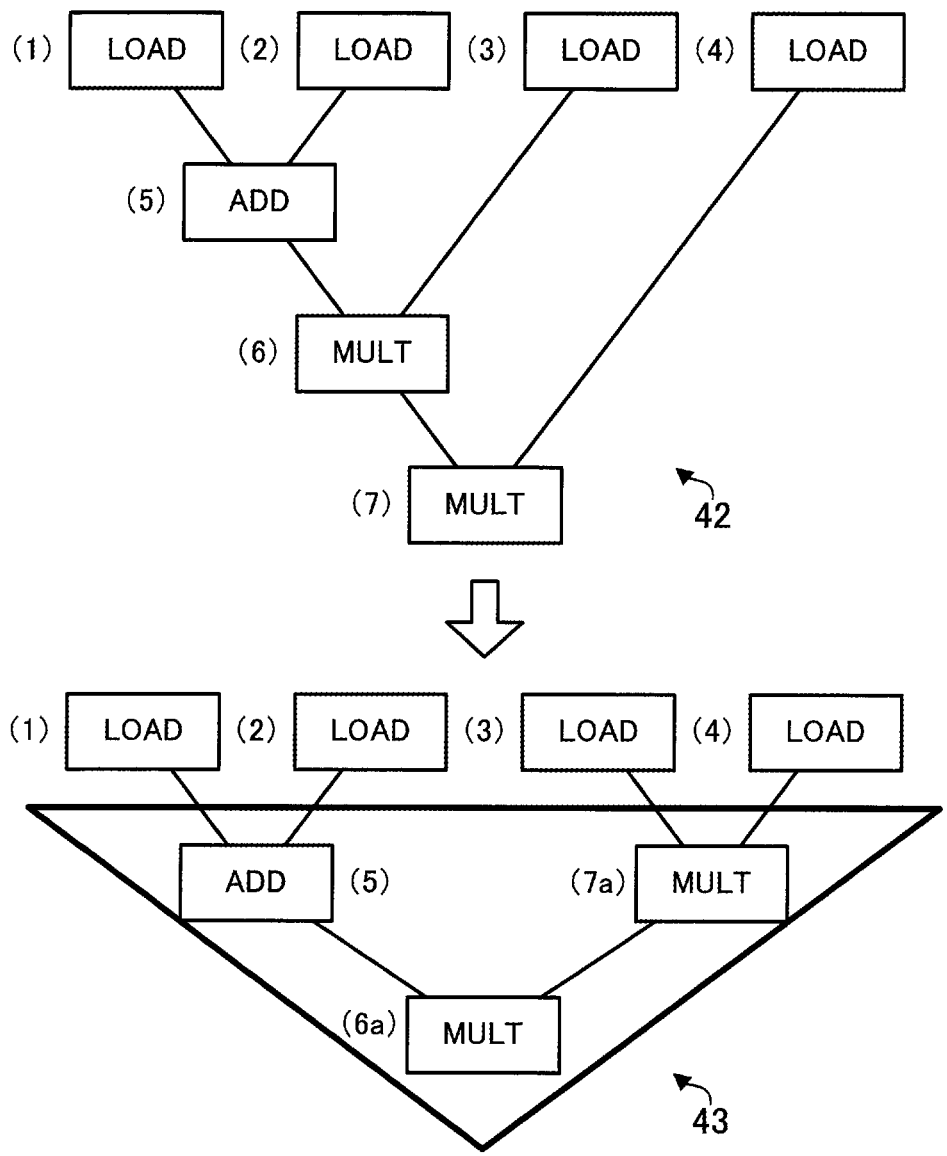
FIG. 17 illustrates an example of pre-adjustment of a dependency tree for FMA normalization.

FIG. 17 illustrates an example of pre-adjustment of a dependency tree for FMA normalization.

The analysis unit 126 performs pre-adjustment so as to detect many triangle partial trees.

In this example, consider the case of a dependency tree 42 including instructions 1 to 7 illustrated in FIG. 17. The instructions 1 to 4 are load instructions, and the instruction 5 is an addition instruction. The instructions 6 and 7 are multiplication instructions. The instruction 5 depends on the instructions 1 and 2, the instruction 6 depends on the instructions 3 and 5, and the instruction 7 depends on the instructions 4 and 6. The dependency tree 42 is deformable to a dependency tree 43 without changing the substantial meaning of the operations. The dependency tree 43 includes the instructions 1 to 5, 6a, and 7a. The instructions 6a and 7a are multiplication instructions. The instruction 7a depends on the instructions 3 and 4, and the instruction 6a depends on the instructions 5 and 7a.

The dependency tree 42 is deformed to the dependency tree 43 by moving the instruction 7 to between the instructions 6 and 3, making the instruction 7 depend on the instructions 3 and 4, and making the instruction 6 depend on the instructions 5 and 7. The dependency tree 42 is to multiply the addition result of the instruction by the value loaded by the instruction 3, and then multiply thus obtained multiplication result by the value loaded by the instruction 4. On the other hand, the dependency tree 43 is to multiply the value loaded by the instruction 3 by the value loaded by the instruction 4, and then multiply thus obtained multiplication result by the addition result of the instruction 5. Since the multiplication satisfies the associative law, the dependency trees 42 and 43 produce the same operation result in the end.

To deform a dependency tree, the analysis unit 126 detects first, second, and third instructions satisfying the following conditions from the dependency tree. The first instruction is a multiplication instruction or an addition instruction, and depends on a load instruction or another non-operation instruction as one of its two child instructions (definition instructions for the first instruction) and depends on the second instruction as the other child instruction. The second instruction specifies the same operation type as the first instruction (multiplication or addition), depends on a non-operation instruction as one of its two child instructions (definition instructions for the second instruction), and depends on the third instruction as the other child instruction. The third instruction is a multiplication instruction or an addition instruction.

After detecting the first, second, and third instructions satisfying the above conditions, the analysis unit 126 moves the first instruction to between the second instruction and the child non-operation instruction of the second instruction, and then makes the first instruction depend on the child non-operation instruction of the second instruction. As a result, a triangle partial tree including the first, second, and third instructions is formed. In this connection, in the deformed dependency tree, the second instruction may be called a "top point" of the partial tree, and the first and third instructions may be called "dependency points".

Figure 18:
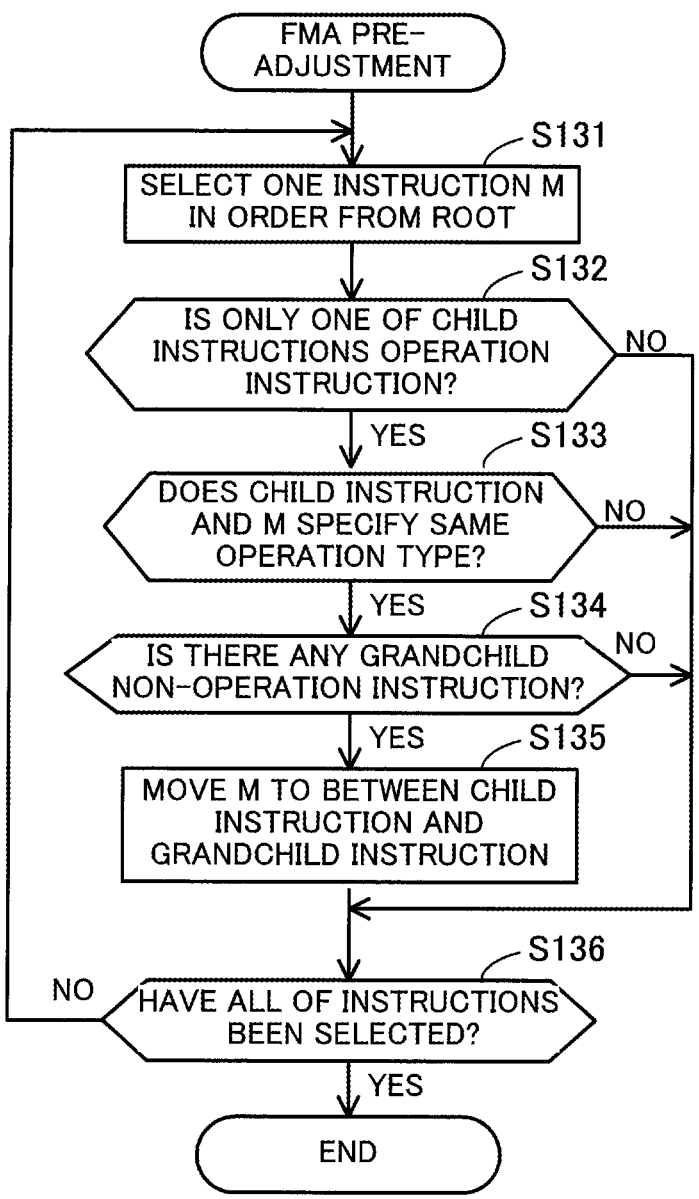
FIG. 18 is a flowchart illustrating an exemplary procedure for FMA pre-adjustment.

FIG. 18 is a flowchart illustrating an exemplary procedure for FMA pre-adjustment.

The process described by this flowchart is performed at the above-described step S2*a*.

(S131) The analysis unit 126 selects one instruction M (first instruction) that is a multiplication instruction or an addition instruction, preferentially in order from closer to the root node of a dependency tree. (S132) The analysis unit 126 determines whether or not only one (second instruction) of the two child instructions of the first instruction is a multiplication instruction, an addition instruction, or another operation instruction and whether or not the other instruction is a load instruction or another non-operation instruction. If only one child instruction is an operation instruction, the process proceeds to step S133. Otherwise, the process proceeds to step S136.

(S133) The analysis unit 126 determines whether the second instruction specifies the same operation type as the first instruction or not. If the first and second instructions specify the same operation type, the process proceeds to step S134. Otherwise, the process proceeds to step S136. (S134) The analysis unit 126 determines whether or not one of the two child instructions (grandchild instructions of the first instruction) of the second instruction is a load instruction or another non-operation instruction, and the other (third instruction) is a multiplication instruction or an addition instruction. If these conditions are satisfied, the process proceeds to step S135. Otherwise, the process proceeds to step S136.

(S135) The analysis unit 126 moves the first instruction selected at step S131 to between the second instruction and the child non-operation instruction of the second instruction. (S136) The analysis unit 126 determines whether all of the instructions included in the dependency tree have been selected at step S131 or not. If all of the instructions have been selected, the process is completed. If there is any unselected instruction, then the process proceeds back to step S131.

The following describes another deformation of a dependency tree.

Figure 19:
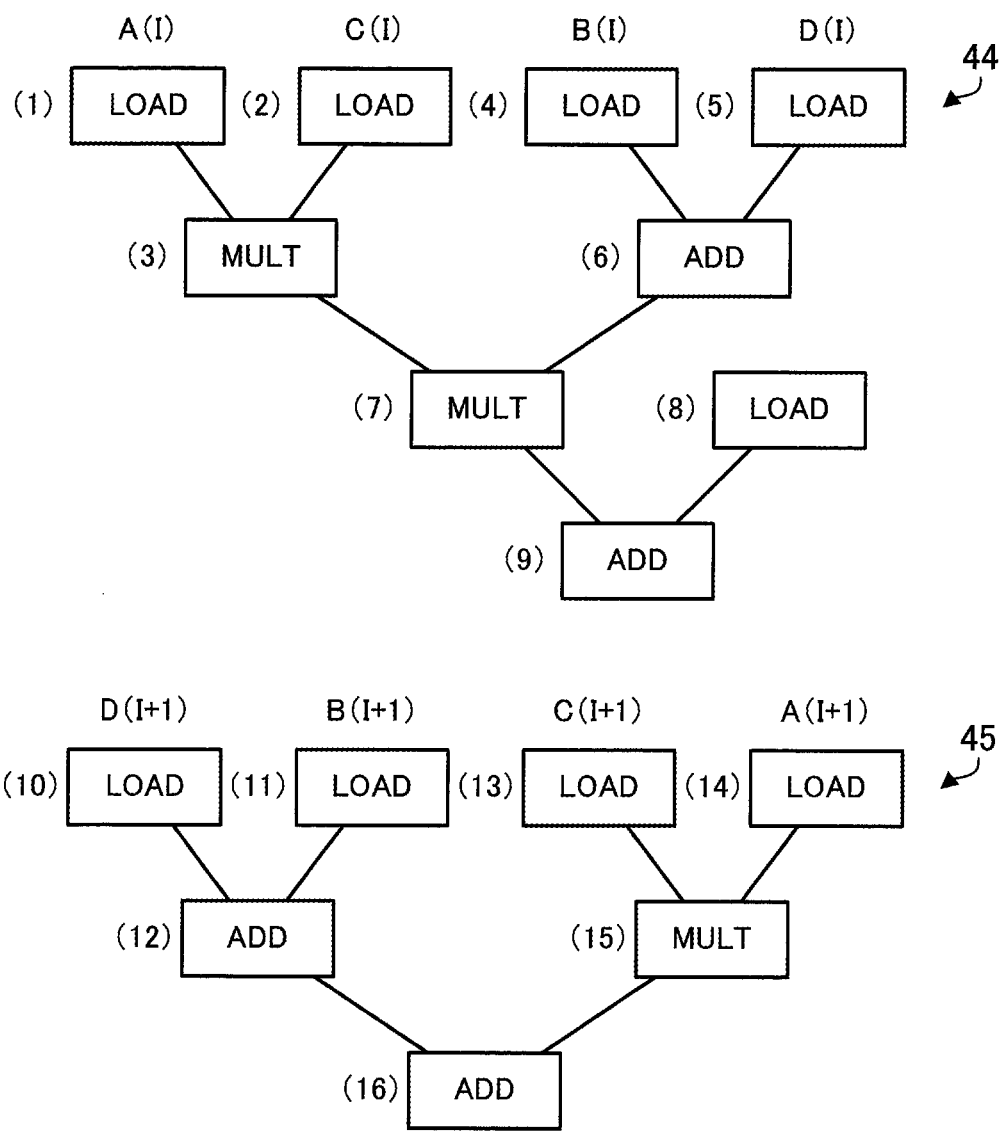
FIG. 19 illustrates an example of a dependency tree prior to deformation.

FIG. 19 illustrates an example of a dependency tree prior to deformation.

Dependency trees 44 and 45 represent dependency relations among the instructions included in intermediate code. Assume now that instructions 1 to 16 are included in a range (translation block) of the code that the compiler 120 processes at a time. The instructions 1, 2, 4, 5, 8, 10, 11, 13, and 14 are load instructions, the instructions 3, 7, and 15 are multiplication instructions, and the instructions 6, 9, 12, and 16 are addition instructions. The instructions 1, 2, 4, and 5 load data A(I), C(I), B(I), and D(I), respectively. The instructions 10, 11, 13, and 14 load data D(I+1), B(I+1), C(I+1), and A(I+1), respectively. There is a high possibility that the data A(I) and A(I+1) are arranged adjacent to each other on the RAM and so are the data B(I) and B(I+1), the data C(I) and C(I+1), and the data D(I) and D(I+1).

The instruction 3 depends on the instructions 1 and 2, the instruction 6 depends on the instructions 4 and 5, the instruction 7 depends on the instructions 3 and 6, and the instruction 9 depends on the instructions 7 and 8. The instruction 12 depends on the instructions 10 and 11, the instruction 15 depends on the instructions 13 and 14, and the instruction 16 depends on the instructions 12 and 15. The dependency tree 44 includes the instructions 1 to 9, and the dependency tree 45 includes the instructions 10 to 16. That is to say, a set of the instructions 1 to 9 and a set of the instructions 10 to 16 have no dependency relations with each other and are therefore executable in parallel.

There is an idea that the analysis unit 126 converts a combination of an instruction of the dependency tree 44 and an instruction of the dependency tree 45 to SIMD. However, it is not easy to search for combinations of instructions that are convertible to SIMD because the dependency trees 44 and 45 have different shapes. For example, only a combination of instructions 7 and 15 at the depth of two and a combination of instructions 9 and 16 at the depth of one are detected by simply searching for instructions that exist at the same depth and specify the same operation type. Therefore, the analysis unit 126 deforms the dependency trees 44 and 45 so that the dependency trees 44 and 45 have similar shapes.

Figure 20:
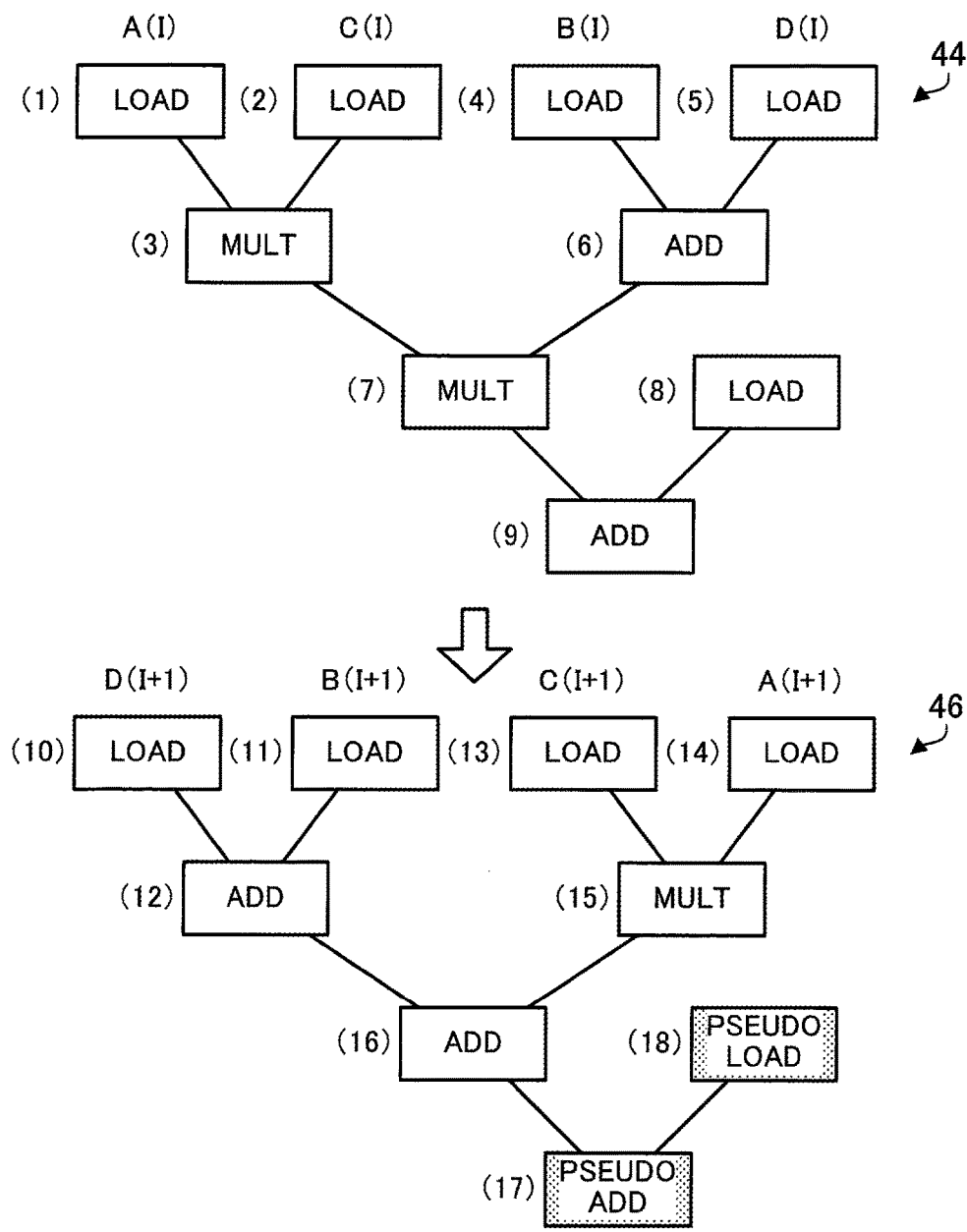
FIG. 20 illustrates a first example of deformation of a dependency tree.

FIG. 20 illustrates a first example of deformation of a dependency tree.

The height of the dependency tree 44 (the number of nodes from the root node up to and including the deepest leaf node) is four, whereas the height of the dependency tree 45 is three. Therefore, the analysis unit 126 deforms the shorter dependency tree 45 into a dependency tree 46 by inserting therein pseudo instructions.

A pseudo instruction is an instruction that does not cause any difference in data before and after an insertion. A pseudo addition instruction (pseudo ADD) is to add zero to an input value. A pseudo subtraction instruction (pseudo SUB) is to subtract zero from an input value. A pseudo multiplication instruction (pseudo MULT) is to multiply an input value by one. A pseudo division instruction (pseudo DIV) is to divide an input value by one. A pseudo load instruction is to read the same data again so as not to change data stored in a register. A pseudo store instruction is to overwrite data stored in the RAM with the same data so as not to change the data.

The dependency tree 46 is generated by inserting instructions 17 and 18 in the dependency tree 45 including the instructions 10 to 16. The instruction is a pseudo addition instruction inserted so as to correspond to the instruction 9 of the dependency tree 44. The instruction 18 is a pseudo load instruction inserted so as to correspond to the instruction 8 of the dependency tree 44. The instruction 17 depends on the instructions 16 and 18. Insertion of the instructions 17 and 18 makes the dependency tree 46 have the same height as the dependency tree 44. In this way, the analysis unit 126 inserts pseudo instructions in the dependency tree 45 so that the dependency tree 45 has the same height as the dependency tree 44 and that as many instructions which specify the same operation type as possible exist at the same depth.

Figure 21:
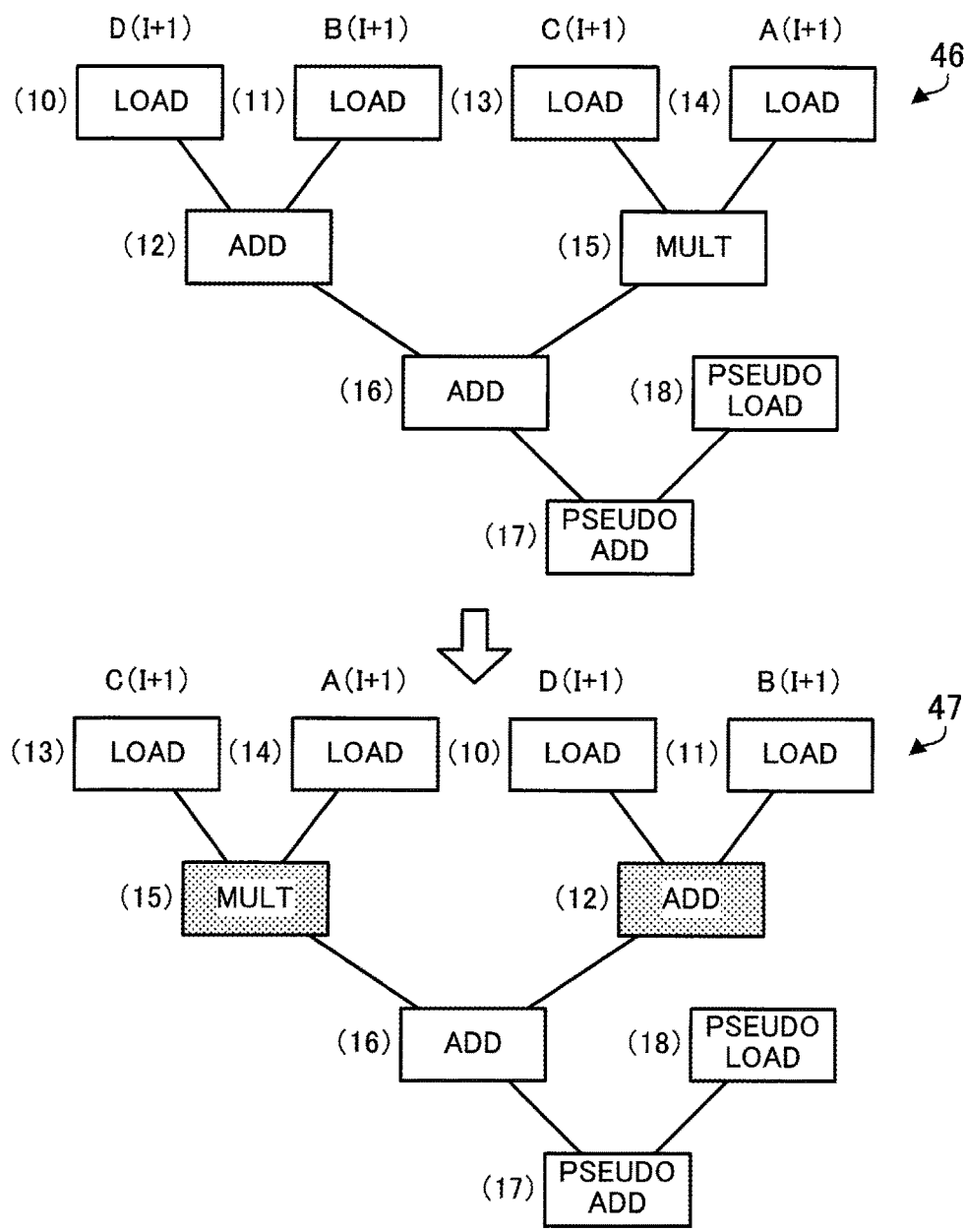
FIG. 21 illustrates a second example of deformation of a dependency tree.

FIG. 21 illustrates a second example of deformation of a dependency tree.

The analysis unit 126 sorts instructions whose order is changeable, according to operation type so as to increase a probability that instructions that perform the same type of operations exist at corresponding positions of the dependency trees 44 and 46. The change of the order of operations is done in each of the dependency trees 44 and 46. FIG. 21 exemplifies deformation of the dependency tree 46 into a dependency tree 47 by changing the order of operations.

To sort instructions, the analysis unit 126 previously determines a priority order of operations. For example, with respect to the four arithmetic operations, the priority order is set to an order of multiplication (MULT), division (DIV), addition (ADD), and subtraction (SUB) (i.e., MULT>DIV>ADD>SUB). In this case, the instructions 12 and 15 both having dependency relations with the instruction 16 are detected as a combination of instructions that are replaceable with each other, and according to the priority order of operations, the multiplication instruction 15 is moved to the left side of the addition instruction 12 in the dependency tree. On the other hand, in the case of employing the above priority order of operations, the dependency tree 44 does not need to be deformed.

Figure 22:
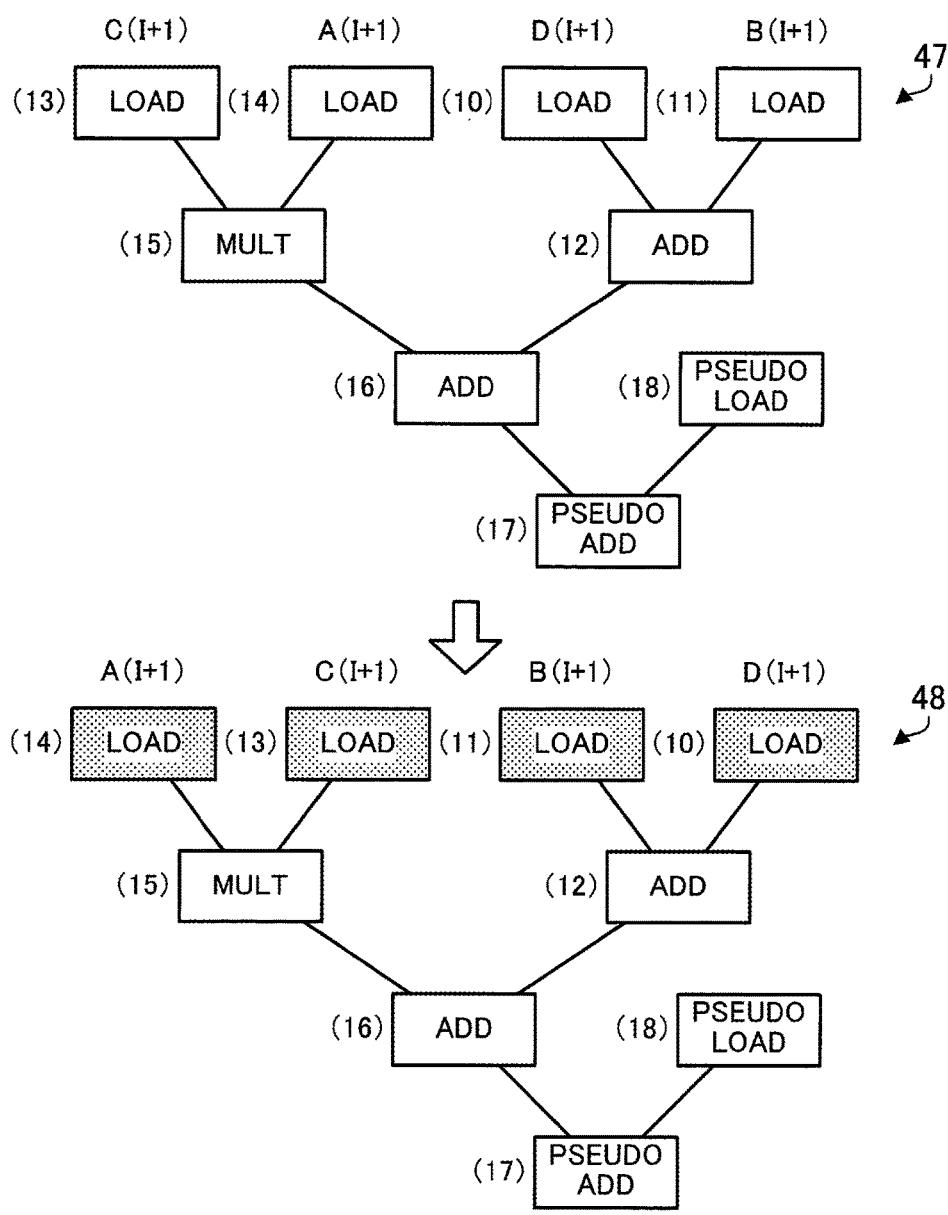
FIG. 22 illustrates a third example of deformation of a dependency tree.

FIG. 22 illustrates a third example of deformation of a dependency tree.

When converting a combination of load instructions to SIMD, the analysis unit 126 sorts load instructions according to variable name so that a plurality of load instructions accesses as close storage areas of the RAM to each other as possible. Replacement of variable names is done in each of the dependency trees 44 and 47. FIG. 22 exemplifies deformation of the dependency tree 47 into the dependency tree 48 by replacing variable names with each other.

For example, a priority order of variable names is set to A>B>C>D. In this case, the instructions 10 and 11 both having dependency relations with the instruction 12 are detected as a combination of load instructions that are replaceable with each other, and according to their variable names, the instruction 11 is moved to the left side of the instruction 10 in the dependency tree. In addition, the instructions 13 and 14 both having dependency relations with the instruction 15 are detected as a combination of load instructions that are replaceable with each other, and according to their variable names, the instruction 14 is moved to the left side of the instruction 13 in the dependency tree. Information of the variable names is included in the intermediate code stored in the intermediate code storage unit 124.

In this connection, referring to FIG. 21, the instruction number of an instruction is moved together with the contents of the instruction. However, in the internal processing of the analysis unit 126, only the contents of instructions may be replaced with each other, and the instruction numbers thereof may not be replaced, as described later. This means that, for example, the instruction with the instruction number of 12 may be changed from an addition instruction to a multiplication instruction. Similarly, referring to FIG. 22, the instruction number of an instruction is moved together with the variable name of data to be loaded. However, in the internal processing of the analysis unit 126, only variable names may be replaced with each other, and the instruction numbers may not be replaced. For example, the variable name of data to be loaded by an instruction with the instruction number of 13 may be changed from C(I+1) to A(I+1). In addition, either the change of the order of operations described with reference to FIG. 21 or the replacement of variable names described with reference to FIG. 22 may be performed first.

Figure 23:
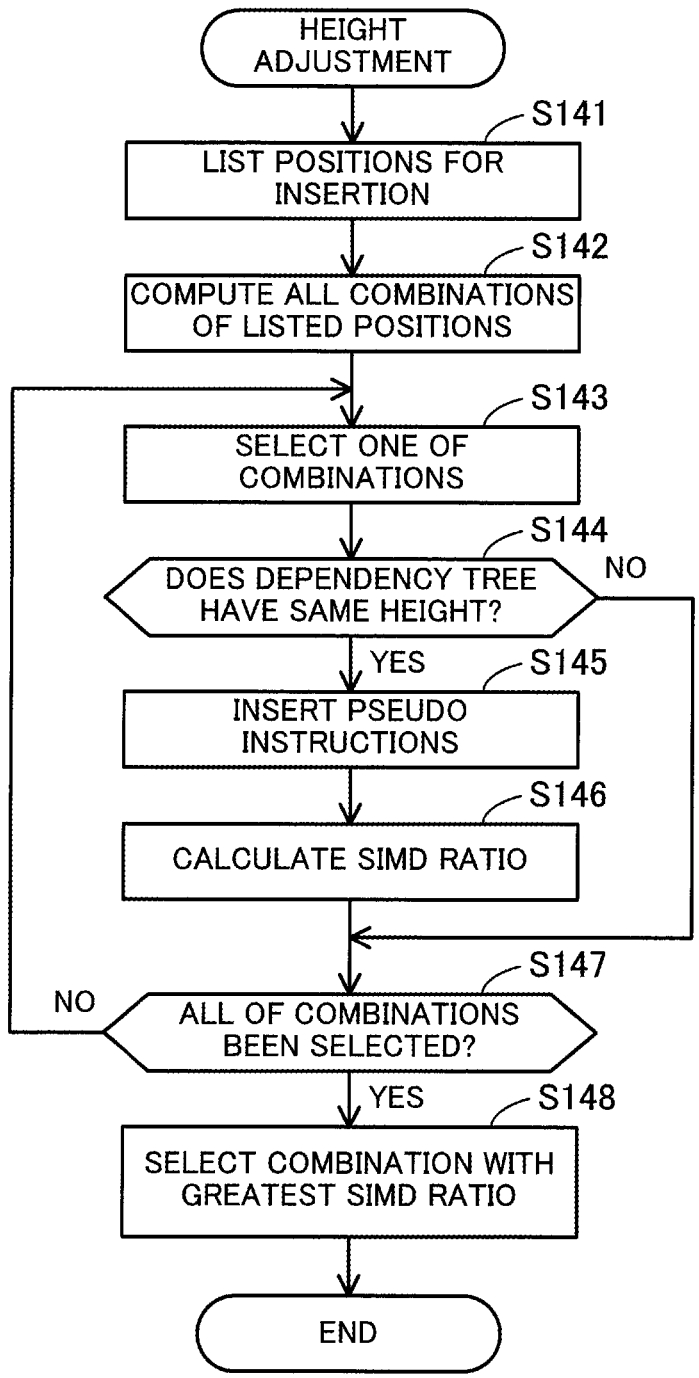
FIG. 23 is a flowchart illustrating an exemplary procedure for height adjustment.

FIG. 23 is a flowchart illustrating an exemplary procedure for height adjustment.

The process described by this flowchart is performed at the above-described step S2b. This process is performed on each of a plurality of dependency trees excepting the highest dependency tree.

(S141) The analysis unit 126 lists positions where pseudo instructions are insertable in a dependency tree. For example, in the case of the dependency tree 45, seven positions that are one higher than the nodes corresponding to the respective instructions 10 to 16 (in a direction in which the depth becomes smaller) are selected. (S142) The analysis unit 126 computes the power set of the positions listed at step S141 (all combination patterns of the positions). For example, in the case where seven positions are listed, all combination patterns, i.e., an empty set Φ, {position 1}, {positions 1, 2}, {positions 1, 2, 3}, . . . , {position 6}, {positions 6, 7}, and {position 7}, are computed.

(S143) The analysis unit 126 selects one of the combinations of the positions computed at step S142. (S144) The analysis unit 126 determines whether or not the dependency tree, when deformed by inserting a pseudo instruction in each position of the selected combination, has the same height as the other dependency trees to be compared with the dependency tree. If the dependency tree has the same height, the process proceeds to step S145. Otherwise, the process proceeds to step S147.

(S145) The analysis unit 126 inserts a pseudo instruction in each position of the combination selected at step S143. At this time, the analysis unit 126 selects an operation type for the pseudo instruction so that as many instructions which specify the same operation type as possible exist at the same depth in the dependency tree in which the pseudo instruction is to be inserted and the other dependency trees to be compared with the dependency tree. (S146) The analysis unit 126 compares instructions existing at the same depth among the dependency tree having the pseudo instructions inserted therein and the other dependency trees to detect combinations of instructions that are convertible to SIMD, and calculates a SIMD ratio of the dependency tree having the pseudo instructions inserted therein (or calculates the number of instructions to be converted to SIMD (the number of SIMD instructions)).

(S147) The analysis unit 126 determines whether all of the combinations have been selected at step S143 or not. If all of the combinations have been selected, the process proceeds to step S148. If there is any unselected combination, the analysis unit 126 cancels the insertion of the pseudo instructions to restore the original dependency tree, and then the process proceeds back to step S143. (S148) The analysis unit 126 determines a combination of positions with the greatest SIMD ratio (or the greatest number of SIMD instructions) calculated at step S146, and inserts the pseudo instructions in the dependency tree according to the determined combination.

Figure 24:
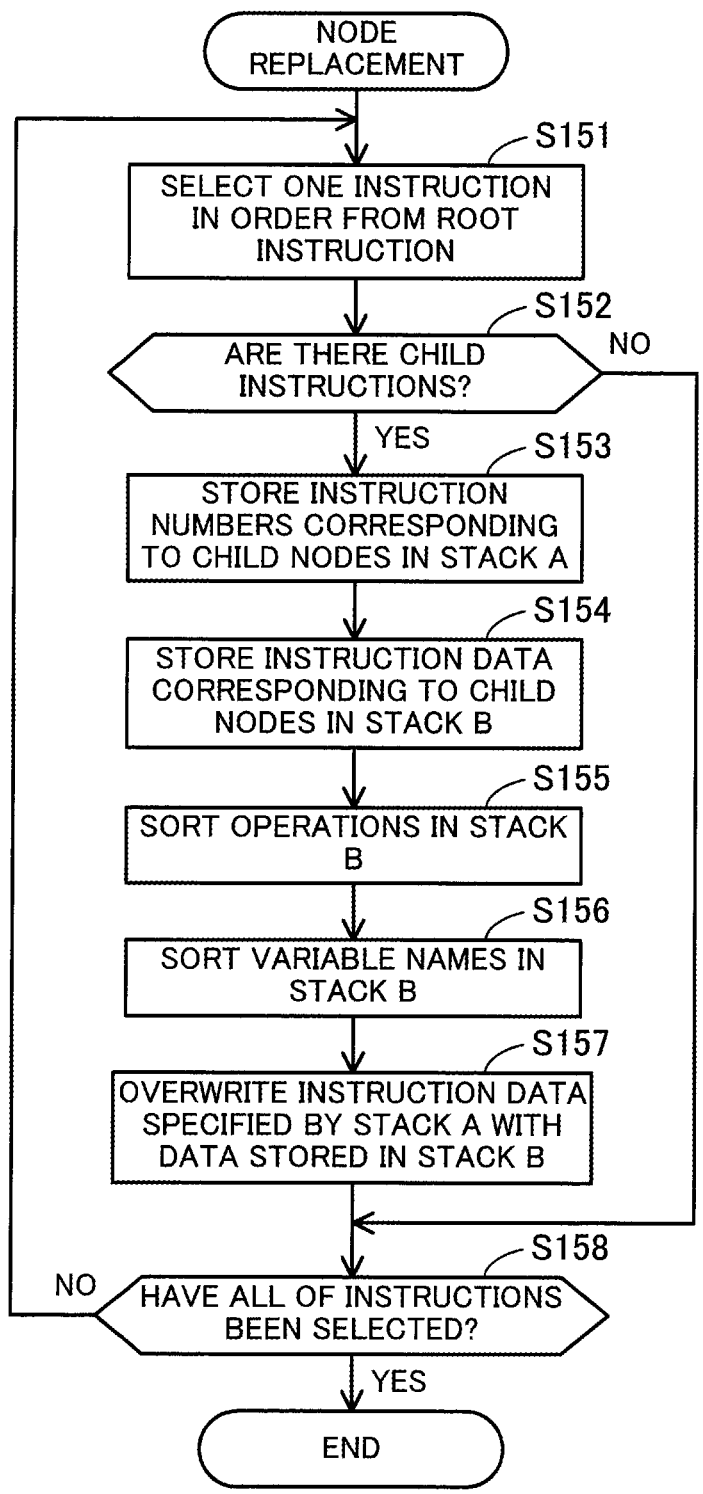
FIG. 24 is a flowchart illustrating an exemplary procedure for node replacement.

FIG. 24 is a flowchart illustrating an exemplary procedure for node replacement.

The process described by this flowchart is performed at the above-described steps S2c and S2d, and is performed on each dependency tree after the process described by the flowchart of FIG. 23 is performed.

(S151) The analysis unit 126 selects one instruction from a dependency tree, preferentially in order from closer to the root node. (S152) The analysis unit 126 determines whether or not there are two or more instructions corresponding to the child nodes of the selected instruction. If there are two or more instructions, the process proceeds to step S153. Otherwise, the process proceeds to step S158.

(S153) The analysis unit 126 stores the instruction numbers of the instructions corresponding to the child nodes, in order from the most left nodes in the dependency tree, in the stack A that is a storage area prepared in the RAM 102. (S154) The analysis unit 126 stores the data of the instructions corresponding to the child nodes in the order that corresponds to the instruction numbers, in a stack B that is another storage area prepared in the RAM 102. For example, in the case where the instruction 16 of the dependency tree 46 is selected at step S151, the instruction numbers 12 and 15 are stored in the stack A, and the data of the instructions 12 and 15 is stored in the stack B.

(S155) The analysis unit 126 sorts the data of the instructions according to the instruction names of the instructions in the stack B. For example, if the data is stored in the stack B in the order of the instructions 12 and 15, the data is replaced to have the order of the instruction 15 and then the instruction 12. (S156) In the case where the data of two or more load instructions is stored in the stack B, the analysis unit 126 confirms the variable names corresponding to the respective load instructions with reference to the intermediate code 146, and then sorts the data of the load instructions according to the variable names in the stack B.

(S157) The analysis unit 126 updates the instruction data 151 by overwriting data at positions specified by the instruction numbers stored in the stack A with the data of the instructions stored in the stack B. This means updating a correspondence between instruction numbers and instruction contents since the instruction numbers in the stack A are arranged in the same order as before the sorting. For example, the instruction data for the instruction number of 12 is overwritten with the data of the instruction 15, and the instruction data for the instruction number of 15 is overwritten with the data of the instruction 12. (S158) The analysis unit 126 determines whether all of the instructions have been selected at step S151 or not. If all of the instructions have been selected, the process is completed. If there is any unselected instruction, the process proceeds back to step S151.

The following describes FMA normalization of a dependency tree.

FIG. 25 illustrates an example of a conversion rule table.

The conversion rule table 153 is stored in the RAM 102 or the HDD 103. The analysis unit 126 refers to the conversion rule table 153 to rewrite a triangle partial tree included in a dependency tree using FMA instructions (to perform FMA normalization). The conversion rule table 153 includes fields for rule number (No.), original equation, and converted equation. The rule number field contains a number given to a conversion rule. The original equation field contains an equation indicating the operation types of three instructions that are included in a partial tree. The converted equation field contains an equation that is a combination of two or more FMA instructions expressing the original partial tree. An original equation represents application conditions for applying a conversion rule, and a converted equation represents a conversion rule to be applied.

In the original equations and converted equations, symbols A and B denote the first and second data to be referenced by the left dependency point, symbols C and D denote the first and second data to be referenced by the right dependency point.

The conversion rule 1 is applied for a partial tree where the top and two dependency points are all addition instructions. This partial tree is rewritten to $((A\times1+B)\times1+C\times1+D=FMA(FMA(FMA(A, 1, B), 1, C), 1, D)$ using three FMA instructions. The conversion rule 2 is applied for a partial tree where the top and left dependency points are addition instructions and the right dependency point is a multiplication instruction. This partial tree is rewritten to $((C\times D+A)\times1+B=FMA(FMA(C, D, A), 1, B)$ using two FMA instructions. Note that the partial tree to which the conversion rule 2 is applied is deformed to a partial tree to which the conversion rule 5 is applied, through the operation sorting of the above-described step S2c.

The conversion rule 3 is applied for a partial tree where the top point is a multiplication instruction and the two dependency points are addition instructions. This partial tree is rewritten to $((A\times1+B)\times(C\times1+D)+0=FMA(FMA(A, 1, B), FMA(C, 1, D), 0)$ using three FMA instructions. The conversion rule 4 is applied for a partial tree where the top and right dependency points are multiplication instructions and the left dependency point is an addition instruction. This partial tree is rewritten to $((A\times1+B)\times C+0)\times D+0=FMA(FMA(FMA(A, 1, B), C, 0), D, 0)$ using three FMA instructions. Note that the partial tree to which the conversion rule 4 is applied is deformed to a partial tree to which the conversion rule 7 is applied, at the above-described step S2c.

The conversion rule 5 is applied for a partial tree where the top and right dependency points are addition instructions and the left dependency point is a multiplication instruction. This partial tree is rewritten to $(A\times B+C)\times1+D=FMA(FMA(A, B, C), 1, D)$ using two FMA instructions. The conversion rule 6 is applied for a partial tree where the top point is an addition instruction and the two dependency points are multiplication instructions. This partial tree is rewritten to $A\times B+(C\times D+0)=FMA(A, B, FMA(C, D, 0))$ using two FMA instructions.

The conversion rule 7 is applied for a partial tree where the top and left dependency points are multiplication instructions and the right dependency point is an addition instruction. This partial tree is rewritten to $((C\times1+D)\times A+0)\times B+0=FMA(FMA(FMA(C, 1, D), A, 0), B, 0)$ using three FMA instructions. The conversion rule 8 is applied for a partial tree where the top and two dependency points are all multiplication instructions. This partial tree is rewritten to $((A\times B+0)\times C+0)\times D+0=FMA(FMA(FMA(A, B, 0), C, 0), D, 0)$ using three FMA instructions.

In this connection, a subtraction instruction (SUB) included in intermediate code may be rewritten to an addition instruction (ADD) by reversing the codes of its input operands. A division instruction (DIV) may be rewritten to a function, or may be rewritten using a plurality of instructions other than division instructions. Therefore, the FMA normalization of the second embodiment uses dependency trees that do not include any subtraction or division instructions.

Figure 26A:
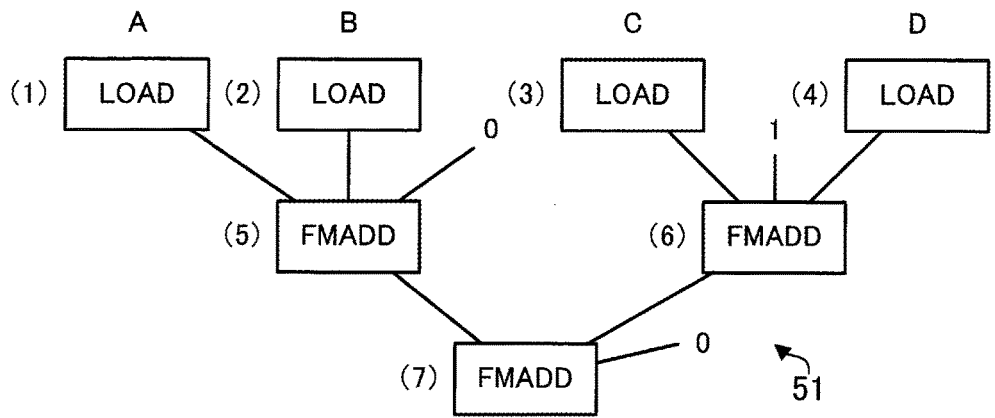
FIGS. 26A and 26B illustrate examples of a FMA normalization pattern.
Figure 26B:
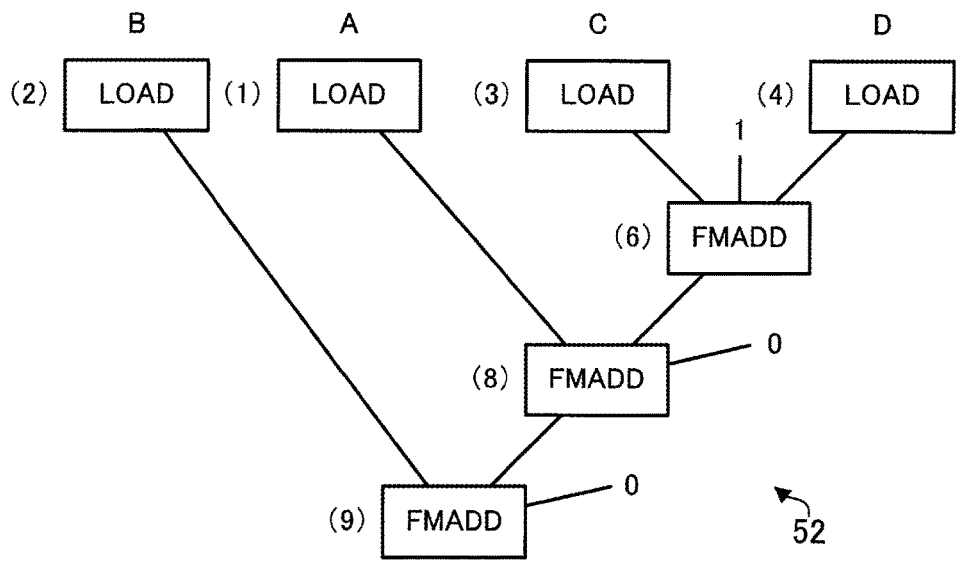

FIGS. 26A and 26B illustrate examples of a FMA normalization pattern.

To define conversion rules, a plurality of conversion patterns may be considered for the same partial tree. For example, FIGS. 26A and 26B illustrate patterns 1 and 2 that are considered for a partial tree where the top and left dependency points are multiplication instructions and the right dependency point is an addition instruction (conversion rule 7).

The pattern 1 is to rewrite the dependency tree to a dependency tree 51 including $(A\times B+0)\times(C\times1+D)+0=FMA(FMA(A, B, 0), FMA (C, 1, D), 0)$. The pattern 2 is obtained by applying the conversion rule 7 of FIG. 25. The pattern 2 is to rewrite the dependency tree to a dependency tree 52 including $((C\times1+D)\times A+0)\times B+0=FMA(FMA(FMA(C, 1, D), A, 0), B, 0)$.

Note that the dependency tree 51 includes two FMA instructions at the depth of two, whereas the dependency tree 52 includes one FMA instruction at each depth. More instructions at the same depth cause more combination patterns of instructions that are convertible to SIMD. Therefore, the deformation to the dependency tree 52 is more preferable than that to the dependency tree 51.

Figure 27:
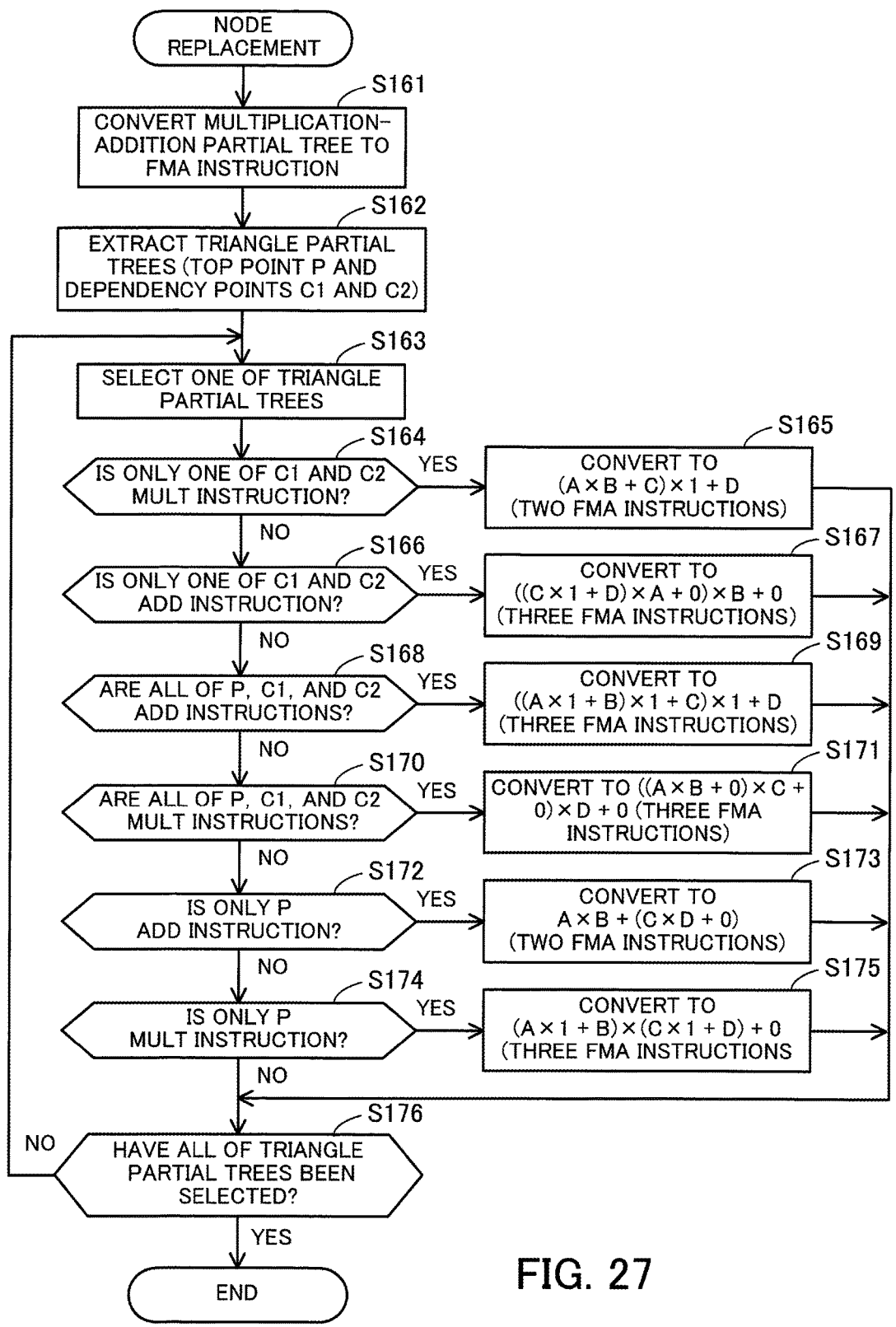
FIG. 27 is a flowchart illustrating an exemplary procedure for FMA normalization.

FIG. 27 is a flowchart illustrating an exemplary procedure for FMA normalization.

The process described by this flowchart is performed at the above-described step S3.

(S161) The analysis unit 126 extracts, from a dependency tree, a multiplication-addition partial tree, that is, a combination of a multiplication instruction and an addition instruction that refers to the multiplication result. Then, the analysis unit 126 rewrites the extracted partial tree to a single FMA instruction. (S162) The analysis unit 126 extracts, from the dependency tree, triangle trees, that is, partial trees that satisfy any application conditions described by the conversion rules 1 to 8 registered in the conversion rule table 153. Each partial tree includes one top point P that is a multiplication instruction or an addition instruction and two dependency points C1 and C2 each of which is a multiplication instruction or an addition instruction. (S163) The analysis unit 126 selects one of the triangle partial trees extracted at step S162.

(S164) The analysis unit 126 determines whether only one of the dependency points C1 and C2 among the three instructions is a multiplication instruction (MULT) or not. That is, the analysis unit 126 determines whether to apply the conversion rule 5 for the triangle partial tree. If this condition is satisfied, the process proceeds to step S165. Otherwise, the process proceeds to step S166. (S165) The analysis unit 126 converts the triangle partial tree into (A×B+C)×1+D=FMA(FMA(A, B, C), 1, D) using two FMA instructions.

(S166) The analysis unit 126 determines whether only one of the dependency points C1 and C2 among the three instructions is an addition instruction (ADD) or not. That is, the analysis unit 126 determines whether to apply the conversion rule 7 for the triangle partial tree. If this condition is satisfied, the process proceeds to step S167. Otherwise, the process proceeds to step S168. (S167) The analysis unit 126 converts the triangle partial tree into ((C×1+D)×A+0)×B+0=FMA(FMA(FMA(C, 1, D), A, 0), B, 0) using three FMA instructions.

(S168) The analysis unit 126 determines whether all of the three instructions are addition instructions (ADD) or not. That is, the analysis unit 126 determines whether to apply the conversion rule 1 for the triangle partial tree. If this condition is satisfied, the process proceeds to step S169. Otherwise, the process proceeds to step S170. (S169) The analysis unit 126 converts the triangle partial tree into ((A×1+B)×1+C)×1+D=FMA(FMA(FMA(A, 1, B), 1, C), 1, D) using three FMA instructions.

(S170) The analysis unit 126 determines whether all of the three instructions are multiplication instructions (MULT) or not. That is, the analysis unit 126 determines whether to apply the conversion rule 8 for the triangle partial tree. If this condition is satisfied, the process proceeds to step S171. Otherwise, the process proceeds to step S172. (S171) The analysis unit 126 converts the triangle partial tree into ((A×B+0)×C+0)×D+0=FMA(FMA(FMA(A, B, 0), C, 0), D, 0) using three FMA instructions.

(S172) The analysis unit 126 determines whether only the top point P among the three instructions is an addition instruction (ADD) or not. That is, the analysis unit 126 determines whether to apply the conversion rule 6 for the triangle partial tree. If this condition is satisfied, the process proceeds to step S173. Otherwise, the process proceeds to step S174. (S173) The analysis unit 126 converts the triangle partial tree into A×B+(C×D+0)=FMA(A, B, FMA(C, D, 0)) using two FMA instructions.

(S174) The analysis unit 126 determines whether only the top point P among the three instructions is a multiplication instruction (MULT) or not. That is, the analysis unit 126 determines whether to apply the conversion rule 3 for the triangle partial tree. If this condition is satisfied, the process proceeds to step S175. Otherwise, the process proceeds to step S176. (S175) The analysis unit 126 converts the triangle partial tree into ((A×1+B)×(C×1+D)+0=(FMA(FMA(A, 1, B), FMA(C, 1, D), 0) using three FMA instructions.

(S176) The analysis unit 126 determines whether all of the triangle partial trees have been selected at step S163 or not. If all of the triangle partial trees have been selected, the process is completed. If there is any unselected triangle partial tree, on the other hand, the process proceeds back to step S163.

In this connection, the conversions at steps S165, S167, S169, S171, S173, and S175 are unified using the following four functions: f1(x1, x2, x3, x4, x5)=(x1×x2+x3)×x4+x5; f2(x1, x2, x3, x4, x5, x6, x7)=((x1×x2+x3)×x4+x5)×x6+x7; f3(x1, x2, x3, x4, x5)=x1×x2+(x3×x4+x5); and f4(x1, x2, x3, x4, x5, x6, x7)=(x1×x2+x3)×(x4×x5+x6)+x7.

Step S165 is executed as f1 (A, B, C, 1, D). Step S167 is executed using f2(C, 1, D, A, 0, B, 0). Step S169 is executed using f2(A, 1, B, 1, C, 1, D). Step S171 is executed using f2 (A, B, 0, C, 0, D, 0). Step S173 is executed using f3(A, B, C, D, 0). Step S174 is executed using f4 (A, 1, B, C, 1, D, 0).

The following describes how to select base instructions and how to divide a dependency tree (level management).

Figure 28:
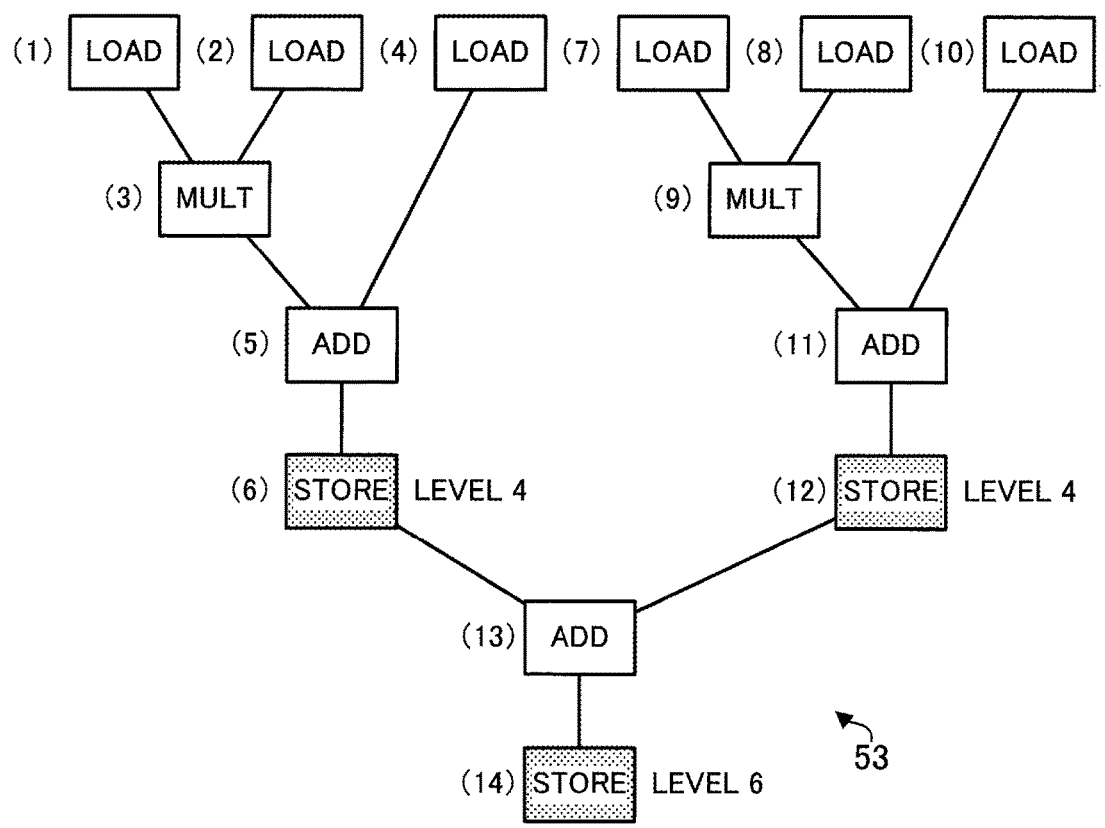
FIG. 28 illustrates an example of dividing a dependency tree.

FIG. 28 illustrates an example of dividing a dependency tree.

This example describes the case where a dependency tree 53 including instructions 1 to 14 is generated as illustrated in FIG. 28. The instructions 3 and 9 are multiplication instructions, and the instructions 5, 11, and 13 are addition instructions. The instructions 1, 2, 4, 7, 8, and 10 are load instructions, and the instructions 6, 12, and 14 are store instructions. The instruction 3 depends on the instructions 1 and 2, the instruction 5 depends on the instructions 3 and 4, and the instruction 6 depends on the instruction 5. The instruction 9 depends on the instructions 7 and 8, the instruction 11 depends on the instructions 9 and 10, and the instruction 12 depends on the instruction 11. The instruction 13 depends on the instructions 6 and 12, and the instruction 14 depends on the instruction 13.

In the second embodiment, this dependency tree 53 is divided into three small dependency trees with the store instructions 6, 12, and 14 as base points, in order to simplify comparison between dependency trees. More specifically, the analysis unit 126 divides the dependency tree 53 into a dependency tree made up of the instructions 1 to 6 with the instruction 6 as a base instruction (root instruction), a dependency tree made up of the instructions 7 to 12 with the instruction 12 as a base instruction, and a dependency tree made up of the instructions 13 and 14 with the instruction 14 as a base instruction.

Then, the analysis unit 126 calculates the level of each base instruction. The level of a base instruction indicates how many nodes exist in the longest one of paths connecting between the node of the base instruction and the respective leaf nodes subordinate to the node of the base instruction in the original dependency tree 53. For example, the level of the instruction 6 is four because four nodes exist in a path connecting the instruction 6 and the instruction 1 (or instruction 2). The level of the instruction 12 is four because four nodes exist in a path connecting the instruction 12 and the instruction 7 (or instruction 8). The level of the instruction 14 is six because six nodes exist in a path connecting the instruction 14 and the instruction 1 (or instruction 2, 7, or 8).

FIG. 29 illustrates an example of base point data.

After selecting base instructions and dividing the dependency tree 53, the analysis unit 126 generates base point data 154. The base point data 154 includes fields for tree identifier (ID), base point number (No.), level, and instruction number, for each divided dependency tree. A tree identifier identifies a divided dependency tree. A base point number is the instruction number of a base instruction. A level is the level of the base instruction that is calculated as described above. The instruction number field lists the instruction numbers of the instructions included in the divided dependency tree.

Figure 30:
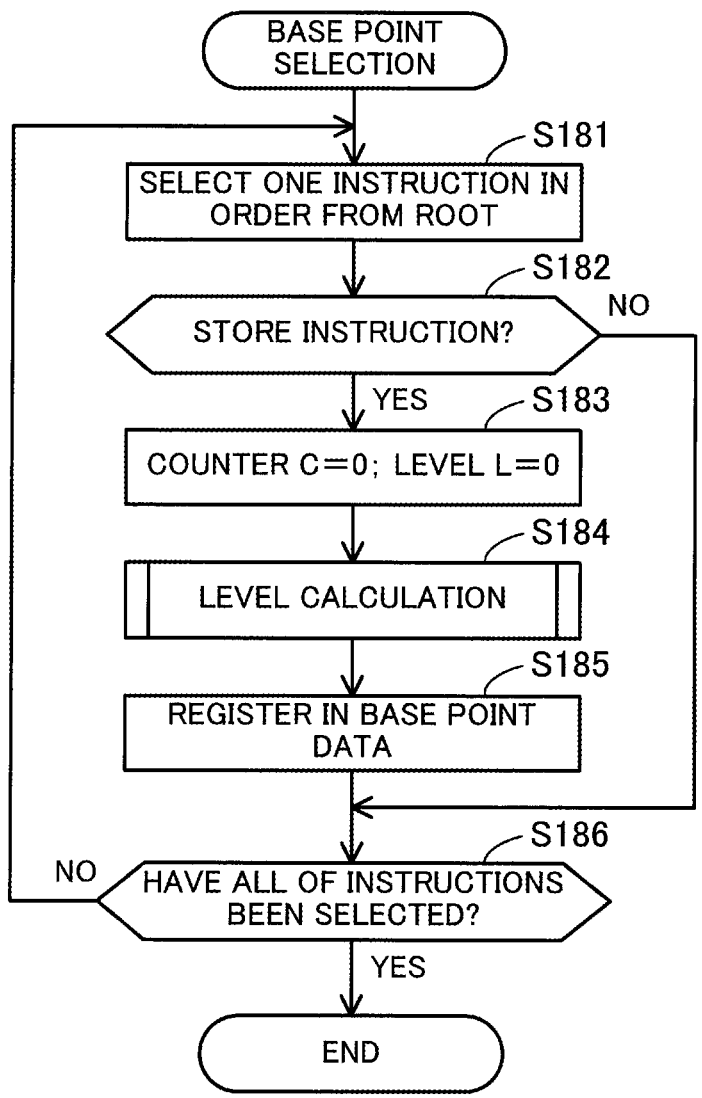
FIG. 30 is a flowchart illustrating an exemplary procedure for selecting base points.

FIG. 30 is a flowchart illustrating an exemplary procedure for selecting base points.

The process described by this flowchart is performed at the above-described step S4.

(S181) The analysis unit 126 selects one of the instructions included in a dependency tree, preferentially in order from closer to the root node. (S182) The analysis unit 126 determines whether the selected instruction is a store instruction or not. If the instruction is a store instruction, the analysis unit 126 determines the instruction as a base instruction, and then the process proceeds to step S183. Otherwise, the process proceeds to step S186 without determining the selected instruction as a base instruction.

(S183) The analysis unit 126 initializes a counter C to zero and a level L to zero. (S184) The analysis unit 126 calculates the level of the base instruction with a subroutine to be described later. (S185) The analysis unit 126 registers information on a dependency tree having the determined base instruction as a root node, in the base point data 154. (S186) The analysis unit 126 determines whether all of the instructions have been selected at step S181 or not. If all of the instructions have been selected, the process is completed. If there is any unselected instruction, the process proceeds back to step S181.

Figure 31:
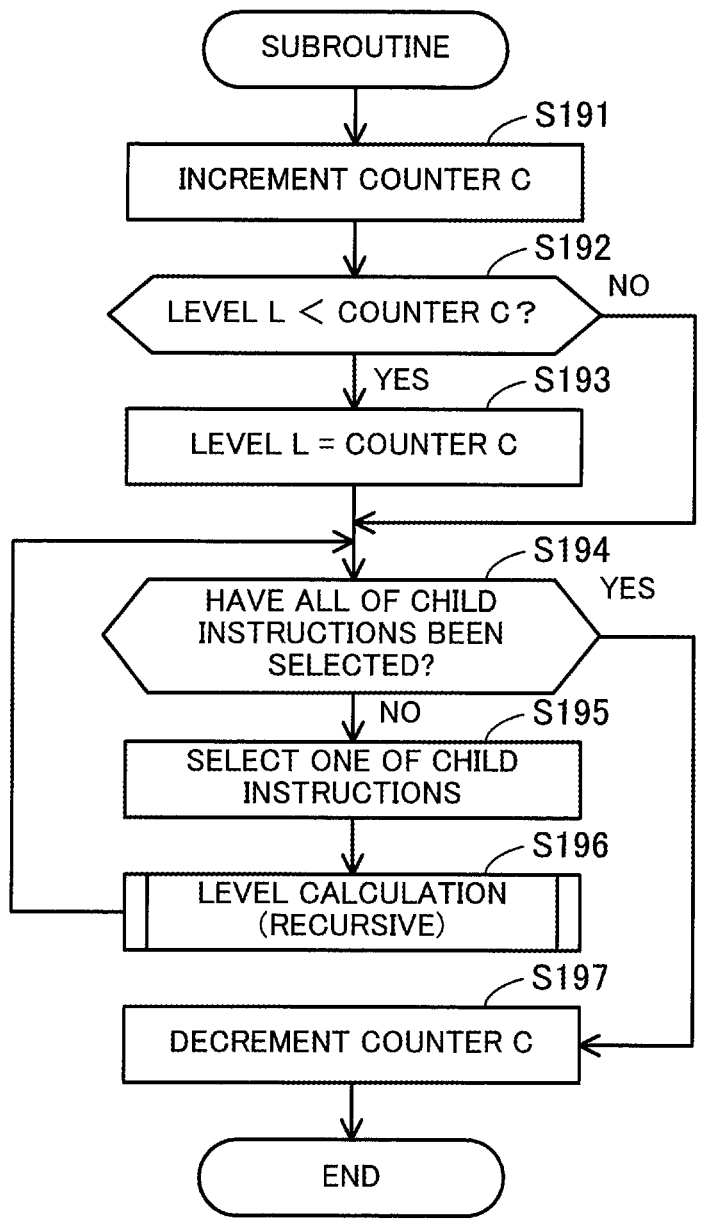
FIG. 31 is a flowchart illustrating an exemplary procedure of a subroutine for level calculation.

FIG. 31 is a flowchart illustrating an exemplary procedure of a subroutine for level calculation.

This subroutine receives a counter C and a level L as parameters. This subroutine is called at the above-described step S184.

(S191) The analysis unit 126 increments the counter C (add one to the value). (S192) The analysis unit 126 determines whether the current value of the level L is smaller than the value of the counter C or not. If the value of the level L is smaller than the value of the counter C, the process proceeds to step S193. Otherwise, the process proceeds to step S194. (S193) The analysis unit 126 substitutes the value of the counter C for the level L.

(S194) The analysis unit 126 determines whether all of the instructions corresponding to the child nodes of the instruction in question have been selected at the following step S195 or not. If all of the instructions have been selected, the process proceeds to step S197. If there is any unselected instruction, the process proceeds to step S195. (S195) The analysis unit 126 selects one of the instructions corresponding to the child nodes. (S196) The analysis unit 126 gives the current level L and counter C as parameters with respect to the instruction corresponding to the child node selected at step S195 to recursively call the subroutine of FIG. 31. Then, the process proceeds to step S194. (S197) The analysis unit 126 decrements the counter C (subtract one from the value).

The following describes how to code a dependency tree.

FIG. 32 illustrates an example of a coding table.

A coding table 155 indicates a correspondence between operation types and codes. The coding table 155 is stored in the RAM 102 or the HDD 103. The analysis unit 126 refers to the coding table 155 to code a dependency tree (step S5).

Referring to the example of FIG. 32, a multiplication instruction (MULT), a division instruction (DIV), an addition instruction (ADD), a subtraction instruction (SUB), a load instruction (LOAD), and a store instruction (STORE) are converted into "1", "2", "3", "4", "5", and "6", respectively.

Further, a multiplication-addition instruction (FMADD) and a negative multiplication-addition instruction (FNMADD) are converted into "7" and "8", respectively. Still further, a multiplication-subtraction instruction (FMSUB) and a negative multiplication-subtraction instruction (FNMSUB) are converted into "9" and "10", respectively. Using data A, B, and C, FNMADD is an operation for calculating −(A×B+C), FMSUB is an operation for calculating A×B−C, and FNMSUB is an operation for calculating −(A×B−C). It may be said that the FNMADD, FMSUB, and FNMSUB instructions belong to a group of FMA-like instructions.

Figure 33:
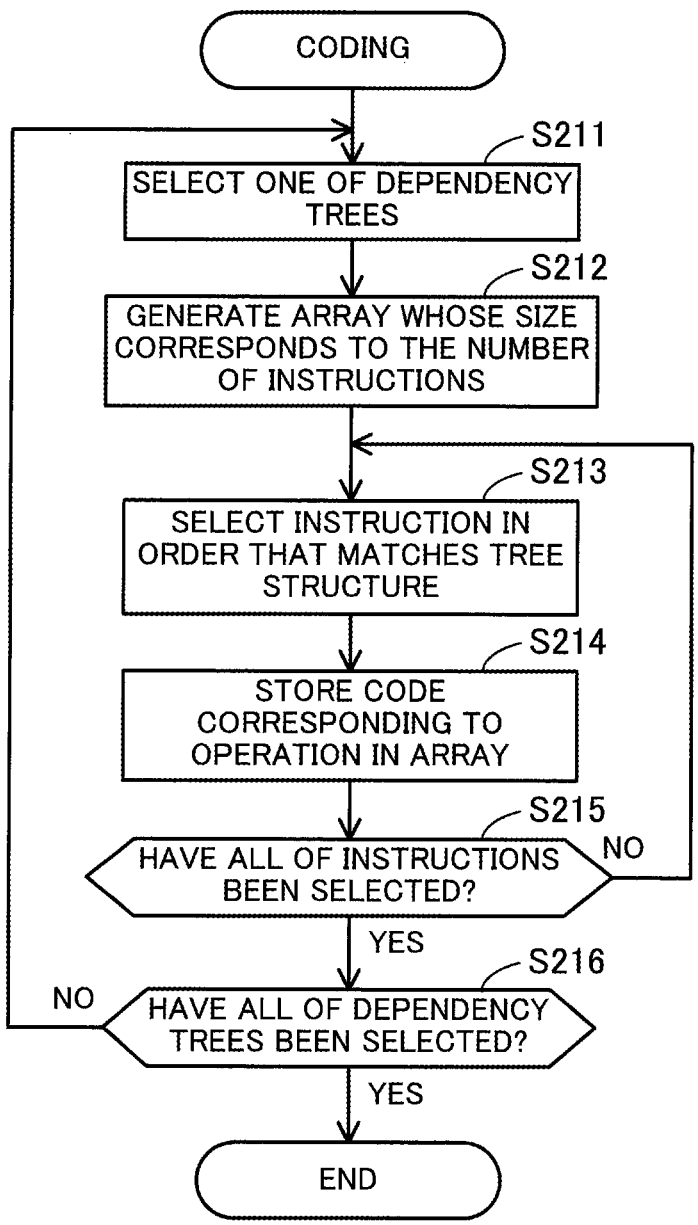
FIG. 33 is a flowchart illustrating an exemplary procedure for coding.

FIG. 33 is a flowchart illustrating an exemplary procedure for coding.

The process described by this flowchart is performed at the above-described step S5.

(S211) The analysis unit 126 selects one of divided dependency trees generated at step S4, with reference to the base point data 154. (S212) The analysis unit 126 generates, as coded data, an array whose size corresponds to the number of instructions included in the selected dependency tree.

(S213) The analysis unit 126 selects one instruction from the dependency tree selected at step S211, in the order that matches the tree structure. For example, the analysis unit 126 selects an instruction from the dependency tree with a backtracking depth-first search. In the case of the dependency tree having the instruction 6 as a base point illustrated in FIG. 28, the instruction is selected in the order of instructions 1, 2, 3, 4, 5, and 6. (S214) The analysis unit 126 searches the coding table 155 for a code corresponding to the operation type specified by the selected instruction, and stores the found code in the array. When an i-th instruction is selected at step S213, the code corresponding to the i-th instruction is stored at the i-th position in the array. For example, in the case of the dependency tree having the instruction 6 as a base point illustrated in FIG. 28, a code array of 5, 5, 1, 5, 3, and 6 is generated as coded data corresponding to this dependency tree.

(S215) The analysis unit 126 determines whether all of the instructions have been selected at step S213 or not. If all of the instructions have been selected, the process proceeds to step S216. If there is any unselected instruction, the process proceeds back to step S213. (S216) The analysis unit 126 determines whether all of the dependency trees have been selected at step S211 or not. If all of the dependency trees have been selected, the process is completed. If there is any unselected dependency tree, the process proceeds back to step S211.

The following describes how to compute combination candidates of dependency trees and how to determine combinations of dependency trees.

Figure 34:
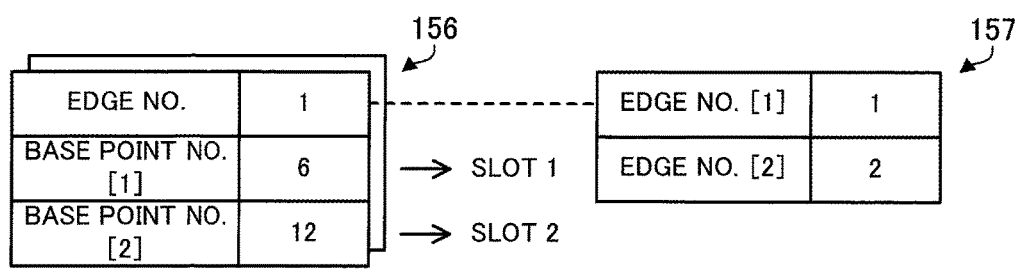
FIG. 34 illustrates an example of edge data and pack data.

FIG. 34 illustrates an example of edge data and pack data.

The analysis unit 126 computes combination candidates of dependency trees, and generates edge data 156. The analysis unit 126 also determines combinations of dependency trees, and generates pack data 157.

The edge data 156 is generated for each combination of dependency trees, and includes fields for edge number (No.) and two or more base point numbers. An edge number is a number identifying an edge (a combination of dependency trees). The field for a base point number [S] (S=1, 2, . . . ) contains the instruction number of the base instruction of a dependency tree. The number of base point numbers corresponds to the degree of SIMD parallelism. In conversion to SIMD, an S-th slot is allocated to the instructions of a dependency tree corresponding to the base point number [S]. That is, a slot 1 is allocated to the instructions of a dependency tree corresponding to the base point number [1], and a slot 2 is allocated to the instructions of a dependency tree corresponding to the base point number [2].

The pack data 157 indicates a set (pack) of one or more combinations of dependency trees to be used for generating SIMD instructions, among the combinations of dependency trees registered in the edge data 156. The pack data 157 includes fields for one or more edge numbers. The edge data 156 and the pack data 157 are associated with each other by edge numbers.

Figure 35:
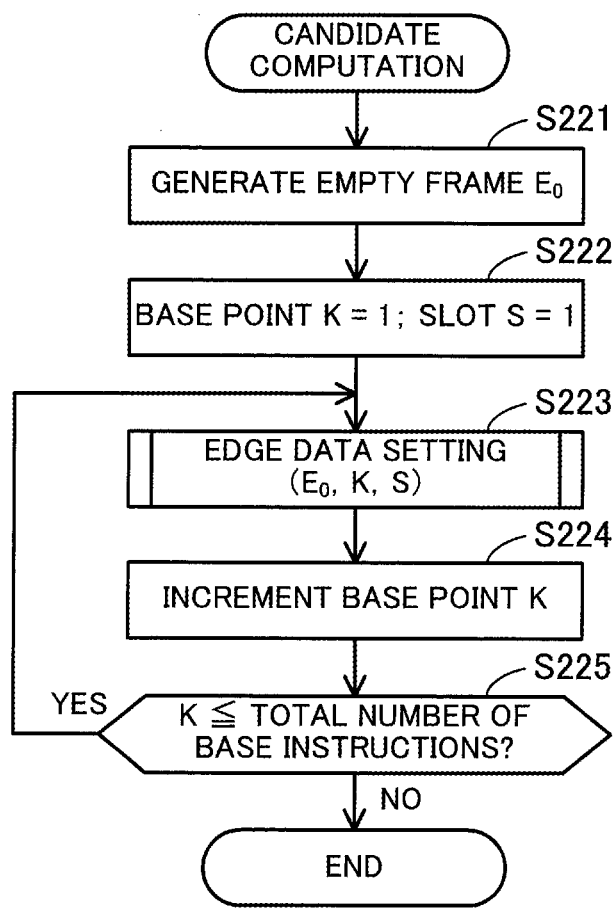
FIG. 35 is a flowchart illustrating an exemplary procedure for computing candidates.

FIG. 35 is a flowchart illustrating an exemplary procedure for computing candidates.

The process described by this flowchart is performed at the above-described step S6.

(S221) The analysis unit 126 generates an empty frame $E_0$ for storing one-edge data. The number of base point number fields included in the frame $E_0$ corresponds to the degree of SIMD parallelism. (S222) The analysis unit 126 defines a base point K and slot S as variables, and initializes the base point K to one and the slot S to one.

(S223) The analysis unit 126 sets base point numbers in the frame $E_0$ and a copy frame of the frame $E_0$ with a subroutine to be described later. At this time, the analysis unit 126 gives the frame $E_0$, base point K, and slot S as parameters to the subroutine. (S224) The analysis unit 126 increments the base point K (add one to the value). (S225) The analysis unit 126 determines whether or not the value of the base point K is smaller than or equal to the total number of base instructions (the total number of generated dependency trees). If this condition is satisfied, the process proceeds back to step S223. Otherwise, the process is completed.

Figure 36:
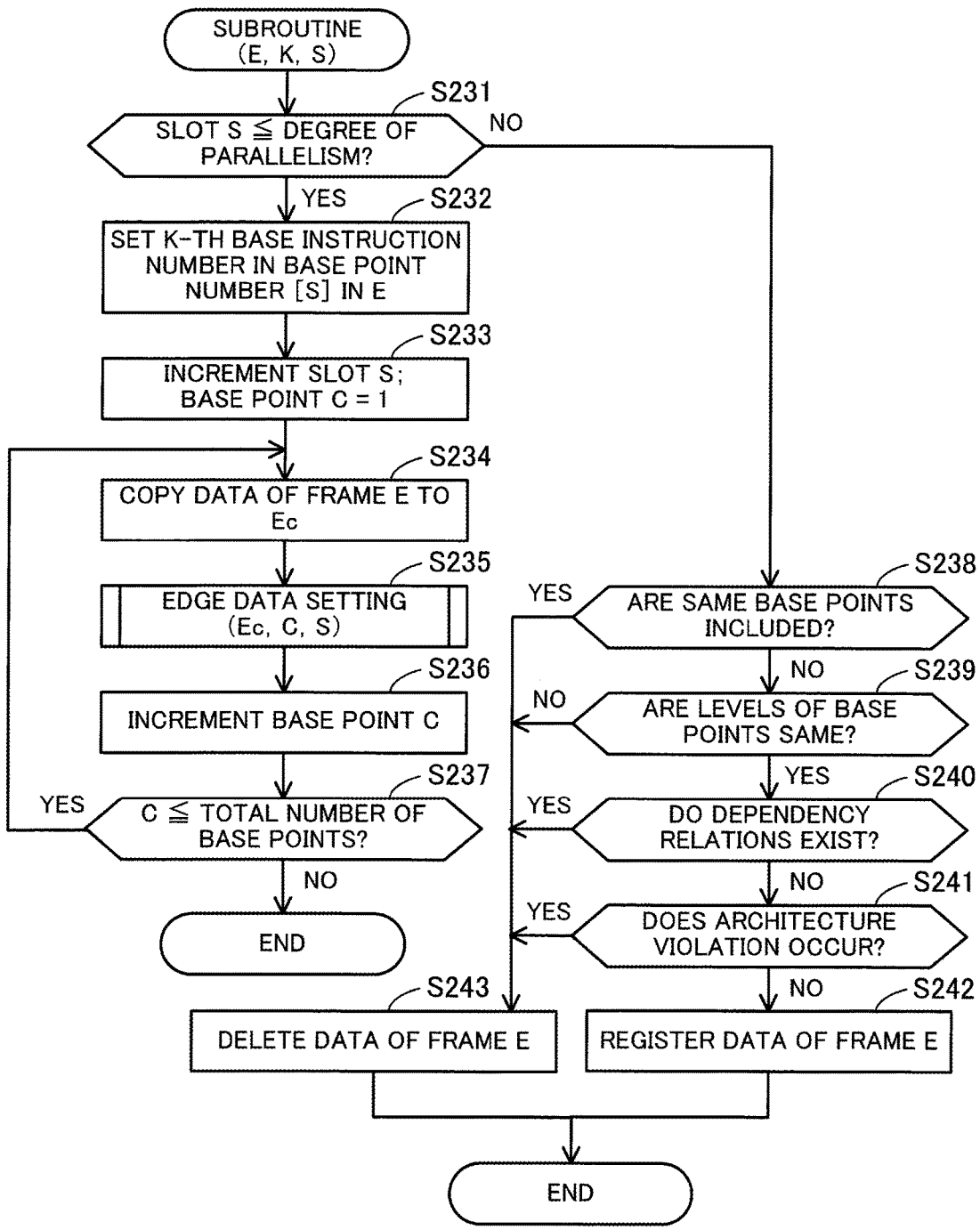
FIG. 36 is a flowchart illustrating an exemplary procedure of a subroutine for setting edge data.

FIG. 36 is a flowchart illustrating an exemplary procedure of a subroutine for setting edge data.

This subroutine receives a frame E, base point K, and slot S as parameters. This subroutine is called at the above-described step S223.

(S231) The analysis unit 126 determines whether or not the value of the slot S is smaller than or equal to the degree of SIMD parallelism, that is, whether or not the frame E still has any empty base point number field. If there is any empty base point number field, the process proceeds to step S232. If all base point number fields are filled, the process proceeds to step S238. (S232) The analysis unit 126 sets the instruction number of the K-th base instruction in the field for the base point number [S] in the frame E. (S233) The analysis unit 126 increments the slot S (add one to the value). The analysis unit 126 also defines a base point C as a variable, and initializes the base point C to one.

(S234) The analysis unit 126 generates a data copy of the frame E as a frame Ec. The base point numbers set in the frame E are also used in the frame Ec. (S235) The analysis unit 126 gives the current frame Ec, base point C, and slot S as parameters to recursively call the subroutine of FIG. 36.

(S236) The analysis unit 126 increments the base point C. (S237) The analysis unit 126 determines whether or not the value of the base point C is smaller than or equal to the total number of base instructions. If this condition is satisfied, the process proceeds to step S234. Otherwise, the subroutine is completed.

(S238) The analysis unit 126 determines whether there are overlapping instruction numbers as base point numbers in the frame E or not. If such overlapping instruction numbers are found, the process proceeds to step S243. Otherwise, the process proceeds to step S239. (S239) The analysis unit 126 determines whether the levels of the base instructions indicated by the base point numbers included in the frame E are all the same or not. If these levels are the same, the process proceeds to step S240. Otherwise, the process proceeds to step S243. (S240) The analysis unit 126 determines whether the plurality of dependency trees indicated by the frame E has dependency relations with each other or not. If they have dependency relations, the process proceeds to step S243. Otherwise, the process proceeds to step S241.

(S241) The analysis unit 126 determines whether combinations of instructions belonging to the plurality of dependency trees indicated by the frame E violate the processor architecture or not. Processor architecture violations may be that constrains on memory allocation are not satisfied, there is a data type (integer type, floating point number type, etc.) unacceptable for SIMD instructions, etc. If an architecture violation is found, the process proceeds to step S243. Otherwise, the process proceeds to step S242. (S242) The analysis unit 126 registers the data of the frame E in the edge data 156, and completes the subroutine. (S243) The analysis unit 126 deletes the data of the frame E, and then completes the subroutine.

Figure 37:
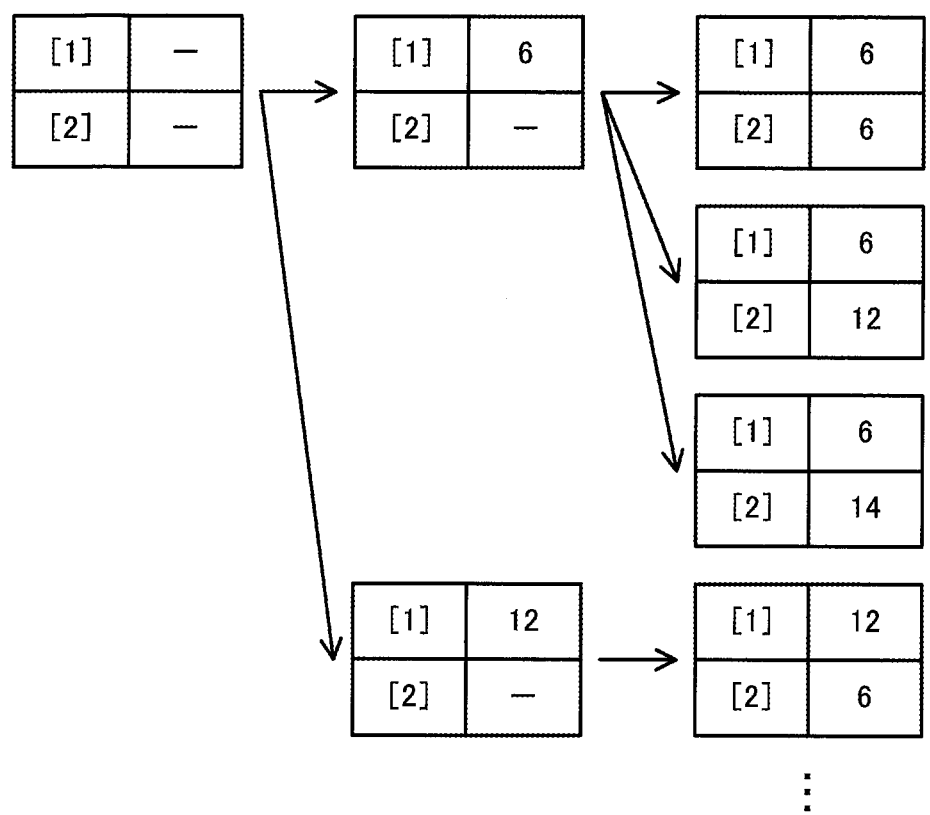
FIG. 37 illustrates an example of how to generate edge data.

FIG. 37 illustrates an example of how to generate edge data.

By recursively executing the subroutine of FIG. 36, the instruction numbers of base instructions are set in the frame E one by one, in the order of base point number [1], base point number [2], . . . . Then, when all base point number fields are filled with data, it is determined whether to combine the plurality of dependency trees indicated by the frame E, and the data is deleted if the plurality of dependency trees is determined not to be combined. For example, data with the base point number [1] of 6 and the base point number [2] of 6 is deleted. In addition, it is determined whether the levels of the plurality of base instructions are all the same or not, and the data is deleted if the base instructions have different levels. For example, if the level of the base instruction with the base point number of 6 and the level of the base instruction with the base point number of 14 are different, data with the base point number [1] of 6 and the base point number [2] of 14 is deleted.

FIG. 38 illustrates an example of pack data candidates.

The analysis unit 126 computes the power set of a plurality of edges as a set of packs, and evaluates each pack in terms of the number of instructions that are convertible to SIMD, in order to select one pack. For example, when there are edges 1 and 2 independent of each other, a pack 1 employing only the edge 1, a pack 2 employing only the edge 2, and a pack 3 employing both the edges 1 and 2 are evaluated.

Figure 39:
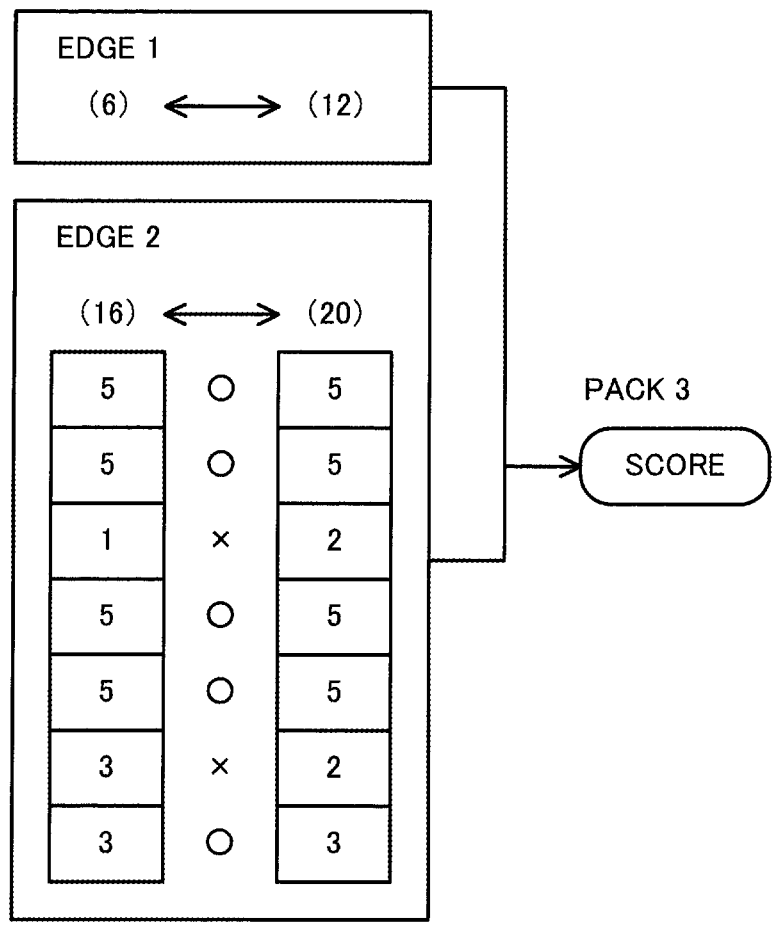
FIG. 39 illustrates an example of how to calculate a score from coded data.

FIG. 39 illustrates an example of how to calculate a score from coded data.

To evaluate packs, the analysis unit 126 calculates the score of each pack. A pack with a higher score indicates that there are more instructions that are convertible to SIMD. The analysis unit 126 compares coded data among a plurality of dependency trees for each edge, and calculates, as the score of the edge, the number of combinations of instructions which exist at corresponding positions and specify the same operation type. Then, the analysis unit 126 adds up the scores of the edges and takes the result as the score of the pack.

Figure 40:
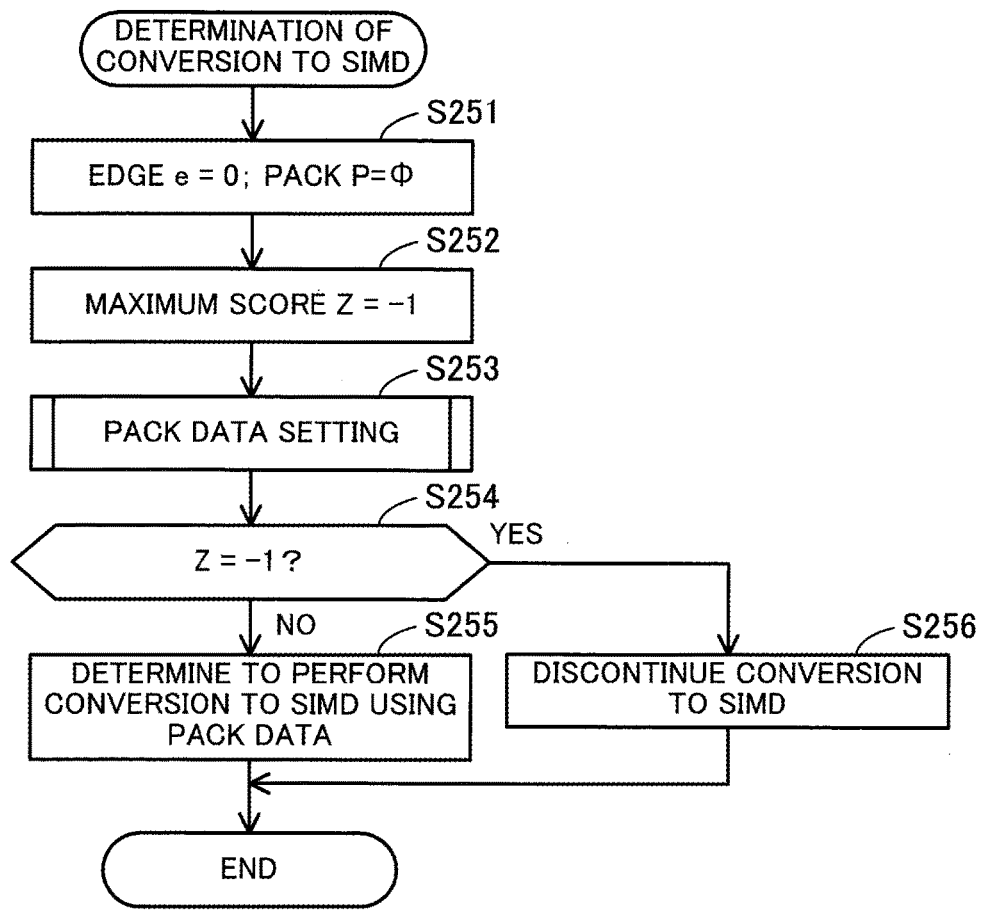
FIG. 40 is a flowchart illustrating an exemplary procedure for determining whether to perform conversion to SIMD.

FIG. 40 is a flowchart illustrating an exemplary procedure for determining whether to perform conversion to SIMD.

The process described by this flowchart is performed at the above-described step S7.

(S251) The analysis unit 126 defines an edge e and pack P as variables, and initializes the edge e to zero and pack P to Φ (empty set). (S252) The analysis unit 126 defines a maximum score Z as a variable, and initializes the maximum score Z to −1. (S253) The analysis unit 126 searches for a pack with the maximum score with a subroutine to be described later.

(S254) The analysis unit 126 determines whether the maximum score Z still has an initial value of −1 or not, i.e., whether no pack has been found or not. In the case where the maximum score Z has an initial value of −1, the process proceeds to step S256.

Otherwise, the process proceeds to step S255. (S255) The analysis unit 126 determines combinations of instructions to be converted to SIMD, from the pack data 157. Instructions to be combined are instructions that exist at corresponding positions of the plurality of dependency trees included in the same edge. (S256) The analysis unit 126 discontinues the conversion of instructions included in the current translation block of the intermediate code 146 to SIMD.

Figure 41:
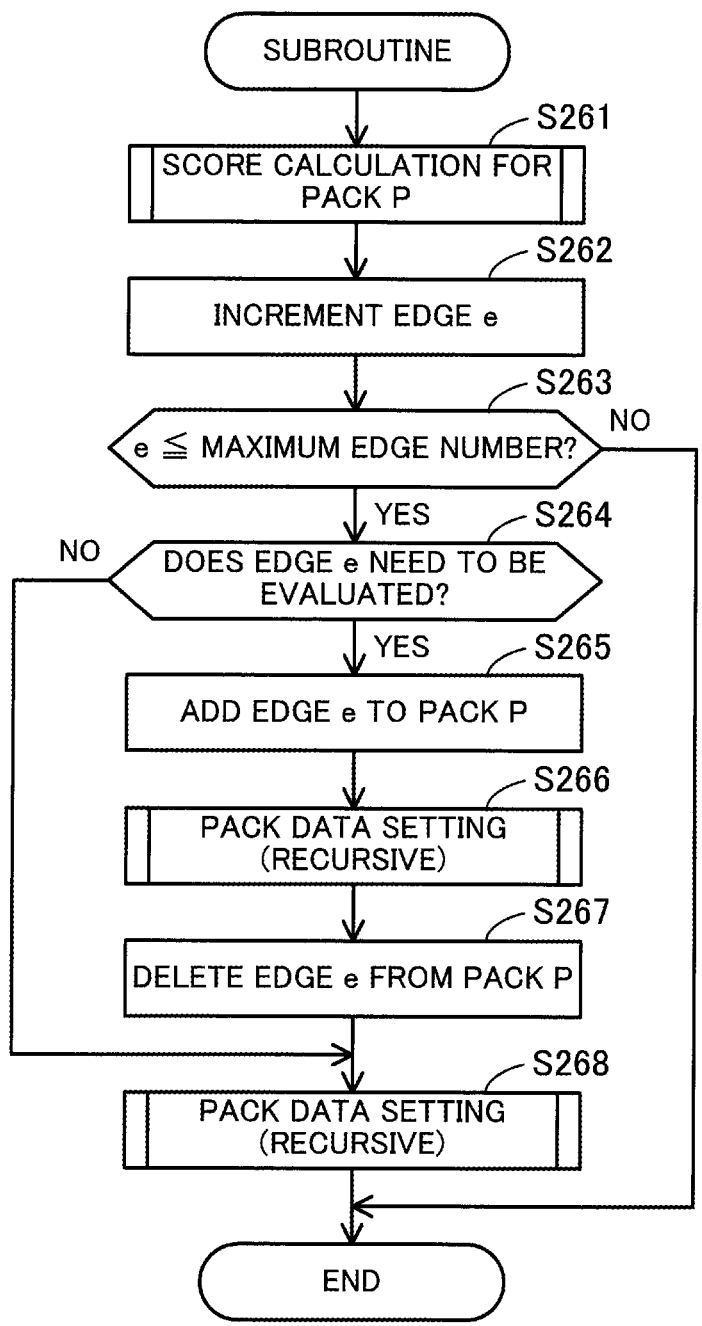
FIG. 41 is a flowchart illustrating an exemplary procedure of a subroutine for setting pack data.

FIG. 41 is a flowchart illustrating an exemplary procedure of a subroutine for setting pack data.

This subroutine receives an edge e and pack P as parameters. This subroutine is called at the above-described step S253.

(S261) The analysis unit 126 calculates the score of the pack P using the coded data with a method to be described later. (S262) The analysis unit 126 increments the edge e (add one to the value). (S263) The analysis unit 126 determines whether or not the value of the edge e is smaller than or equal to the maximum edge number. If this condition is satisfied, the process proceeds to step S264. Otherwise, this subroutine is completed.

(S264) The analysis unit 126 determines whether to evaluate a pack including the e-th edge (edge with an edge number of e). It is determined that the pack including the e-th edge does not need to be evaluated if the pack satisfies any one of the following three conditions. (i) The first condition is that a dependency tree of the e-th edge is already included in the pack P. (ii) The second condition is that a dependency tree of the e-th edge has dependency relations with any of dependency trees already included in the pack P. (iii) The third condition is that the current score of the pack P is smaller by at least a predetermined value than the maximum value of the calculated scores of the other packs, and so this pack would probably not be the best even if the e-th edge is added to the pack P. If the pack including the e-th edge needs to be evaluated, the process proceeds to step S265. Otherwise, the process proceeds to step S268.

(S265) The analysis unit 126 adds the e-th edge to the pack P. (S266) The analysis unit 126 gives the pack P including the e-th edge and the edge e as parameters to recursively call the subroutine of FIG. 41. (S267) The analysis unit 126 removes the e-th edge added at step S265 from the pack P. (S268) The analysis unit 126 gives the pack P which does not include the e-th edge, and the edge e as parameters to recursively call the subroutine of FIG. 41.

Figure 42:
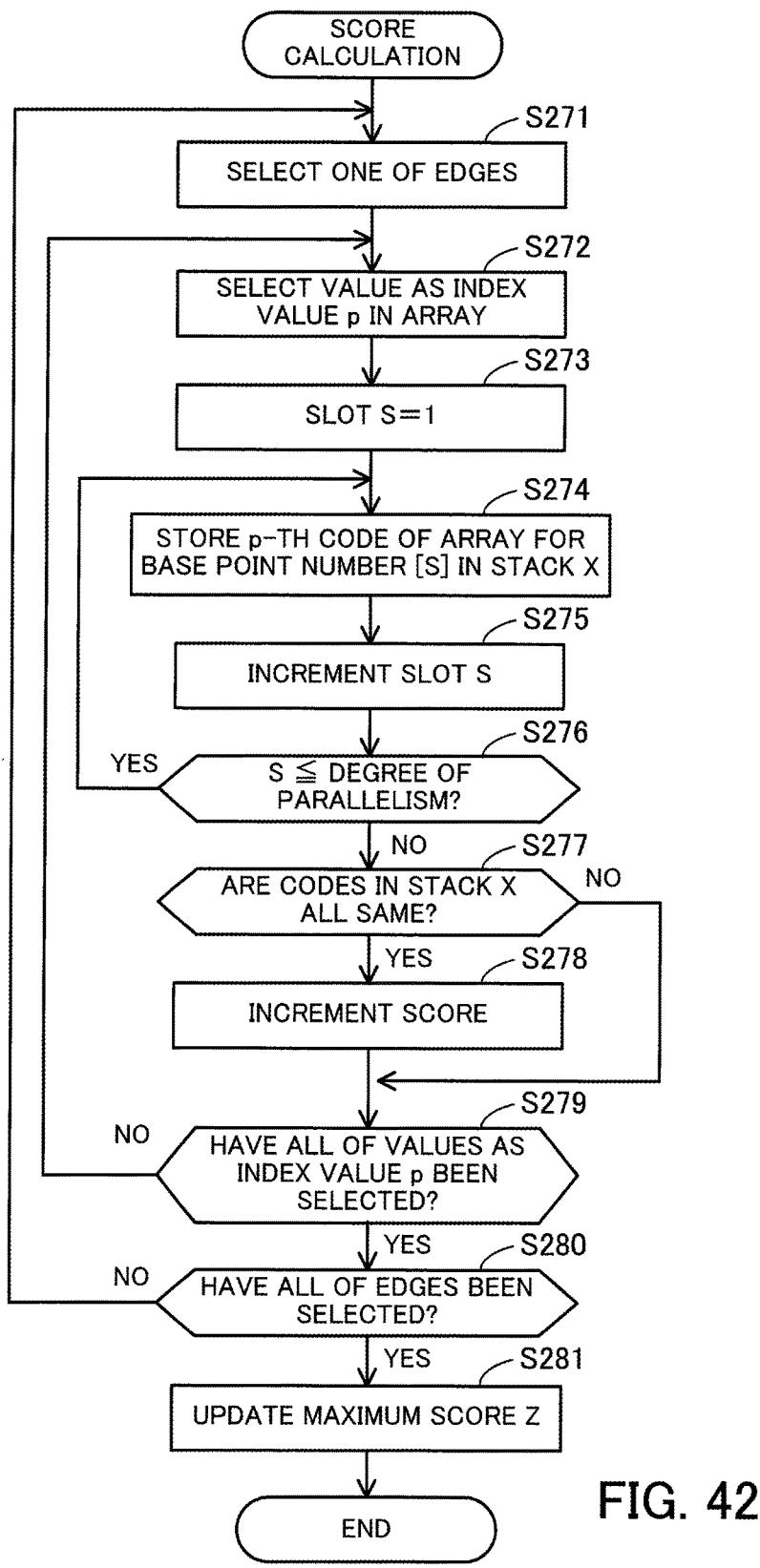
FIG. 42 is a flowchart illustrating an exemplary procedure for score calculation.

FIG. 42 is a flowchart illustrating an exemplary procedure for score calculation.

The process described by this flowchart is performed at the above-described step S261.

(S271) The analysis unit 126 selects one of the edges included in a pack. (S272) The analysis unit 126 selects an index value p for specifying a code included in an array. The index value p varies from one up to a value indicating the length of the longest array among a plurality of arrays corresponding to the plurality of dependency trees belonging to the edge. (S273) The analysis unit 126 defines a slot S as a variable, and initializes the slot S to one.

(S274) The analysis unit 126 selects a dependency tree corresponding to the base point number [S] of the edge selected at step S271, and obtains the array that is the coded data of the selected dependency tree. The analysis unit 126 then stores the p-th code included in the obtained array in a stack X that is a storage area prepared in the RAM 102. In this connection, when the length of the obtained array is smaller than p, a predetermined code (for example, "0") indicating that there is no instruction is stored in the stack X. (S275) The analysis unit 126 increments the slot S (add one to the value). (S276) The analysis unit 126 determines whether or not the value of the slot S is smaller than or equal to the degree of SIMD parallelism. If the value of the slot S is smaller than or equal to degree of parallelism, the process proceeds back to S274. Otherwise, the process proceeds to step S277.

(S277) The analysis unit 126 determines whether the codes stored in the stack X are all the same or not. That is, it is determined whether all of the instructions existing at corresponding positions specify the same operation type or not. If they are the same, the process proceeds to step S278. Otherwise, the process proceeds to step S279. (S278) The analysis unit 126 increments the score of the pack.

(S279) The analysis unit 126 determines whether all of the values used as the index value p have been selected at step S272 or not. If all of the values have been selected, the process proceeds to step S280. If there is any unselected value, the process proceeds back to step S272. (S280) The analysis unit 126 determines whether all of the edges have been selected at step S271 or not. If all of the edges have been selected, the process proceeds to step S281. If there is any unselected edge, the process proceeds back to step S271. (S281) The analysis unit 126 determines whether or not the score of the pack calculated at step S278 is greater than the currently maximum score Z or not. If the score is greater than the maximum score Z, the analysis unit 126 updates the maximum score Z to the calculated score.

Figure 43:
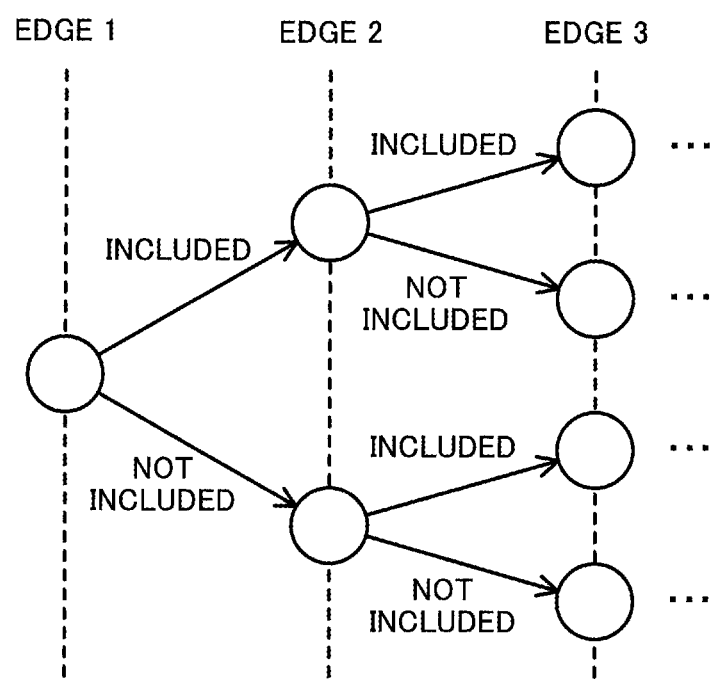
FIG. 43 illustrates an exemplary flow of generating pack data.

FIG. 43 illustrates an exemplary flow of generating pack data.

By recursively calling the subroutine of FIG. 41, the process of evaluating a score is split into a process to be performed when the e-th edge is included in the pack P and a process to be performed when the e-th edge is not included in the pack P. First, the process is split into two according to whether the first edge is included in the pack P or not. Then, each of the two processes is split into two according to whether the second edge is included in the pack P or not, which means that the original process is split into four in total. Subsequently, the processes are split according to the number of edges.

The terminal device 100 of the second embodiment detects partial trees that are rewritable using FMA instructions, from a dependency tree, and converts the dependency tree into a dependency tree including FMA instructions. Then, the terminal device 100 performs an optimization process on intermediate code on the basis of the dependency tree including the FMA instructions. The optimization process includes conversion to FMA, conversion to SIMD, etc. This reduces the number of instructions at the same depth in the dependency tree and also reduces combination patterns of instructions to be found for conversion to SIMD. In addition, many of the instructions included in the dependency tree are converted into FMA instructions, which simplifies instruction scheduling even in the case where different types of instructions have different numbers of execution cycles. Therefore, searching a deformed dependency tree reduces both the amount of computation and the processing time for the optimization process.

Further, a dependency tree is deformed so that many partial trees that match conversion rules appear prior to the FMA normalization. Thereby, many instructions included in the dependency tree are rewritable to FMA instructions. For the FMA normalization, conversion rules are made so as to reduce the number of FMA instructions that exist at the same depth. This abbreviates the load of conversion to SIMD.

In addition, many instructions included in intermediate code are converted into FMA instructions or SIMD-FMA instruction, so as to reduce the number of instructions in object code. In addition, many instructions are converted into FMA instructions or SIMD-FMA instructions, so as to achieve highly efficient scheduling of such few types of instructions with minimum idle time. This improves the execution efficiency of the object code generated by the compiler 120.

As described earlier, the information processing of the first embodiment is realized by causing the compiling apparatus 10 to execute an intended program. The information processing of the second embodiment is realized by causing the terminal device 100 to execute an intended program. Such a program may be recorded on a computer-readable recording medium (for example, recording medium 23). Recording media include magnetic disks, optical discs, magneto-optical discs, semiconductor memories, etc. The magnetic disks include FDs and HDDs. The optical discs include CDs, CD-Rs (Recordable), CD-RWs (Rewritable), DVDs, DVD-Rs, and DVD-RWs.

To distribute the program, portable recording media, on which the program is recorded, may be provided, for example. A computer copies the program recorded on a portable recording medium to a storage device (for example, HDD 103), reads and runs the program from the storage device. Alternatively, the computer may run the program directly from the portable recording medium.

According to one aspect, it is possible to efficiently perform an optimization process at the time of compiling.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A non-transitory computer-readable medium storing therein a compiling program that causes a computer to execute a process comprising:

generating a dependency tree representing dependency relations among a plurality of instructions included in first code;
detecting a first partial tree from the dependency tree, the first partial tree including a first instruction, a second instruction, and a third instruction, the third instruction depending on operation results of the first instruction and the second instruction;
updating the dependency tree by replacing the first partial tree with a second partial tree, wherein the replacing includes converting the first, second and third instructions included in the first partial tree into a plurality of complex instructions under a conversion rule that is determined according to operation types of the first, second and third instructions, the plurality of complex instructions each causing a processor to perform a complex operation that includes a plurality of operations; and
generating second code based on the updated dependency tree;
wherein generating second code includes comparing the updated dependency tree including the complex instructions with another dependency tree including complex instructions, and converting some or all of the plurality of instructions into parallel instructions, the parallel instructions each causing the processor to perform two or more complex instructions in parallel.

2. The non-transitory computer-readable medium according to claim 1, wherein the process further includes, before detecting the first partial tree, detecting a set of instructions from the dependency tree and deforming the set of instructions into the first partial tree, the set of instructions including the first instruction, a fourth instruction, and a fifth instruction and satisfying prescribed conditions, the fourth instruction depending on an operation result of the first instruction, the fifth instruction depending on an operation result of the fourth instruction.

3. A compiling method comprising:
generating, by a processor, a dependency tree representing dependency relations among a plurality of instructions included in first code;
detecting, by the processor, a first partial tree from the dependency tree, and rewriting instructions corresponding to the partial tree to a set of instructions, the instructions corresponding to the first partial tree including a first instruction, a second instruction, and a third instruction, the third instruction depending on operation results of the first instruction and the second instruction;
updating, by the processor, the dependency tree by replacing the first partial tree with a second partial tree, wherein the replacing includes converting the first, second and third instructions included in the first partial tree into a plurality of complex instructions under a conversion rule that is determined according to operation types of the first, second and third instructions, the set of instructions including a the plurality of complex instructions each causing the processor or another processor to perform a complex operation that includes a plurality of operations; and
generating, by the processor, second code based on the updated dependency tree and the set of instructions;
wherein generating second code includes comparing the updated dependency tree including the complex instructions with another dependency tree including complex instructions, and converting some or all of the plurality of instructions into parallel instructions, the parallel instructions each causing the processor to perform two or more complex instructions in parallel.

4. A compiling apparatus comprising:

a memory configured to store first code and second code generated by converting the first code; and a processor configured to perform a process including:

generating a dependency tree representing dependency relations among a plurality of instructions included in the first code;

detecting a first partial tree from the dependency tree, and rewriting instructions corresponding to the partial tree to a set of instructions, the instructions corresponding to the first partial tree including a first instruction, a second instruction, and a third instruction, the third instruction depending on operation results of the first instruction and the second instruction;

updating the dependency tree by replacing the first partial tree with a second partial tree, wherein the replacing includes converting the first, second and third instructions included in the first partial three into a plurality of complex instructions under a conversion rule that is determined according to operation types of the first, second and third instructions, the set of instructions including a the plurality of complex instructions each causing a processor to perform a complex operation that includes a plurality of operations; and generating the second code based on the updated dependency tree and the set of instructions;

wherein generating second code includes comparing the updated dependency tree including the complex instructions with another dependency tree including complex instructions, and converting some or all of the plurality of instructions into parallel instructions, the parallel instructions each causing the processor to perform two or more complex instructions in parallel.

* * * * *